(12) United States Patent
Ichimura

(10) Patent No.: US 12,066,608 B2
(45) Date of Patent: Aug. 20, 2024

(54) ZOOM LENS AND IMAGE PICKUP APPARATUS

(71) Applicant: CANON KABUSHIKI KAISHA, Tokyo (JP)

(72) Inventor: Junya Ichimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 201 days.

(21) Appl. No.: 17/494,341

(22) Filed: Oct. 5, 2021

(65) Prior Publication Data

US 2022/0113522 A1   Apr. 14, 2022

(30) Foreign Application Priority Data

Oct. 12, 2020   (JP) .................................. 2020-172111

(51) Int. Cl.
| | |
|---|---|
| *G02B 15/14* | (2006.01) |
| *G02B 13/02* | (2006.01) |
| *G02B 13/06* | (2006.01) |
| *G02B 27/00* | (2006.01) |
| *H04N 23/60* | (2023.01) |

(52) U.S. Cl.
CPC ..... *G02B 15/145519* (2019.08); *G02B 13/02* (2013.01); *G02B 13/06* (2013.01); *G02B 27/0025* (2013.01); *H04N 23/60* (2023.01)

(58) Field of Classification Search
CPC ............ G02B 15/145519; G02B 13/02; G02B 13/06; G02B 27/0025; G02B 15/1465; G02B 15/163; G02B 9/60; G02B 13/04; G02B 9/26; G02B 13/006; G02B 1/111; G02B 15/14; G02B 27/00; H04N 23/60

USPC ....... 359/676, 672, 684, 695, 714, 705, 725, 359/739, 746, 763

See application file for complete search history.

(56) References Cited

U.S. PATENT DOCUMENTS

| | | | |
|---|---|---|---|
| 5,748,384 A | 5/1998 | Sensui | |
| 2002/0060858 A1 | 5/2002 | Wada | |
| 2003/0103268 A1 | 6/2003 | Nishikawa | |
| 2011/0242675 A1 | 10/2011 | Shigenobu | |
| 2011/0304922 A1 | 12/2011 | Ichimura | |
| 2016/0178877 A1* | 6/2016 | Inoue ............. | G02B 15/145519 359/557 |

(Continued)

FOREIGN PATENT DOCUMENTS

| | | |
|---|---|---|
| CN | 102096179 A | 6/2011 |
| JP | 2016-118658 A | 6/2016 |

(Continued)

OTHER PUBLICATIONS

English translation of JP-2019066654-A (Apr. 2019).*

*Primary Examiner* — Thomas K Pham
*Assistant Examiner* — Kuei-Jen L Edenfield
(74) *Attorney, Agent, or Firm* — Canon U.S.A., Inc. IP Division

(57) ABSTRACT

A zoom lens includes, in order from an object side to an image side, a first lens unit having a negative refractive power, a second lens unit having a positive refractive power, a third lens unit having a negative refractive power, a fourth lens unit having a negative refractive power, and a rear lens unit having a positive refractive power and disposed closest to an image plane. During zooming from a wide-angle end to a telephoto end, the second lens unit moves to the object side, and each distance between adjacent lens units changes. A predetermined condition is satisfied.

27 Claims, 11 Drawing Sheets

(56) References Cited

U.S. PATENT DOCUMENTS

2018/0299657 A1   10/2018  Yoshinaga
2022/0113521 A1*   4/2022  Sudo .................. G02B 27/0025

FOREIGN PATENT DOCUMENTS

| JP | 2018180348 A | | 11/2018 |
| JP | 2019-066654 A | | 4/2019 |
| JP | 2019066654 A | * | 4/2019 |

* cited by examiner

ZOOM LENS AND IMAGE PICKUP APPARATUS

BACKGROUND OF THE DISCLOSURE

Field of the Disclosure

The aspect of the embodiments relates to a zoom lens used in an image pickup apparatus such as a digital camera or a video camera.

Description of the Related Art

Japanese Patent Application Laid-Open No. ("JP") 2016-118658 discloses a zoom lens including a negative first lens unit, a positive second lens unit, a negative third lens unit, a negative fourth lens unit, and a positive fifth lens unit. JP 2019-066654 discloses a zoom lens including a negative first lens unit, a positive second lens unit, a negative third lens unit, and a negative fourth lens unit. Both the zoom lenses are wide-angle lenses having half angle of views to larger than 35°, but especially in wide-angle lenses, distortion and field curvature well are to be corrected.

Each of the zoom lenses disclosed in JP 2016-118658 and JP 2019-066654 uses an aspherical surface lens, which has large unevenness in thickness and a large aperture diameter, in each of the first lens unit and the second lens unit, so as to correct distortion and field curvature well. As a result, a level of difficulty in manufacturing each of the zoom lenses is high.

SUMMARY OF THE DISCLOSURE

A zoom lens according to one aspect of the embodiments includes, in order from an object side to an image side, a first lens unit having a negative refractive power, a second lens unit having a positive refractive power, a third lens unit having a negative refractive power, a fourth lens unit having a negative refractive power, and a last lens unit having a positive refractive power and disposed closest to an image plane. During zooming from a wide-angle end to a telephoto end, the second lens unit moves to the object side, and each distance between adjacent lens units changes. A predetermined condition is satisfied.

An image pickup apparatus including the above zoom lens also constitute another aspect of the present disclosure.

Further features of the disclosure will become apparent from the following description of exemplary embodiments with reference to the attached drawings.

DESCRIPTION OF THE EMBODIMENTS

Referring now to the accompanying drawings, a description will be given of examples according to the present disclosure. FIG. 1, FIG. 3, FIG. 5, FIG. 7 and FIG. 9 illustrate sections at wide-angle ends of zoom lenses according to Example 1, Example 2, Example 3, Example 4, and Example 5, respectively.

In each sectional view, the left side is an object side and the right side is an image side. In the following description, a definition of a lens unit is a group of one or more lenses, and a distance between lens surfaces of adjacent lens units changes during zooming or focusing. In each drawing, each lens unit is illustrated with a reference Bi (i=1, 2, 3, . . . ) in order from the object side. A wide-angle end and a telephoto end are zooming states, or zoom positions, when each lens unit is mechanically located at both ends of a movable range in an optical axis direction during zooming. In each sectional view, arrows indicate respective moving trajectories of the lens units that move during zooming from the wide-angle end to the telephoto end, and indicate respective moving directions of lens units that move during focusing from an infinite distance object to a close distance object.

The zoom lens in each example includes, in order from the object side to the image side, a first lens unit B1 having a negative refractive power, a second lens unit B2 having a positive refractive power, a third lens unit B3 having a negative refractive power, a fourth lens unit B4 having a negative refractive power, and a last lens unit (rear lens unit) BR, or a fifth lens unit, having a positive refractive power. The last lens unit BR is disposed closest to an image plane. In the zoom lens, each distance between adjacent lens units changes during zooming, and during zooming from the wide-angle end to the telephoto end, the first lens unit B1 moves to the image side, or moves to the object side after moving to the image side, and the second lens unit B2 moves to the object side.

Figure 1:
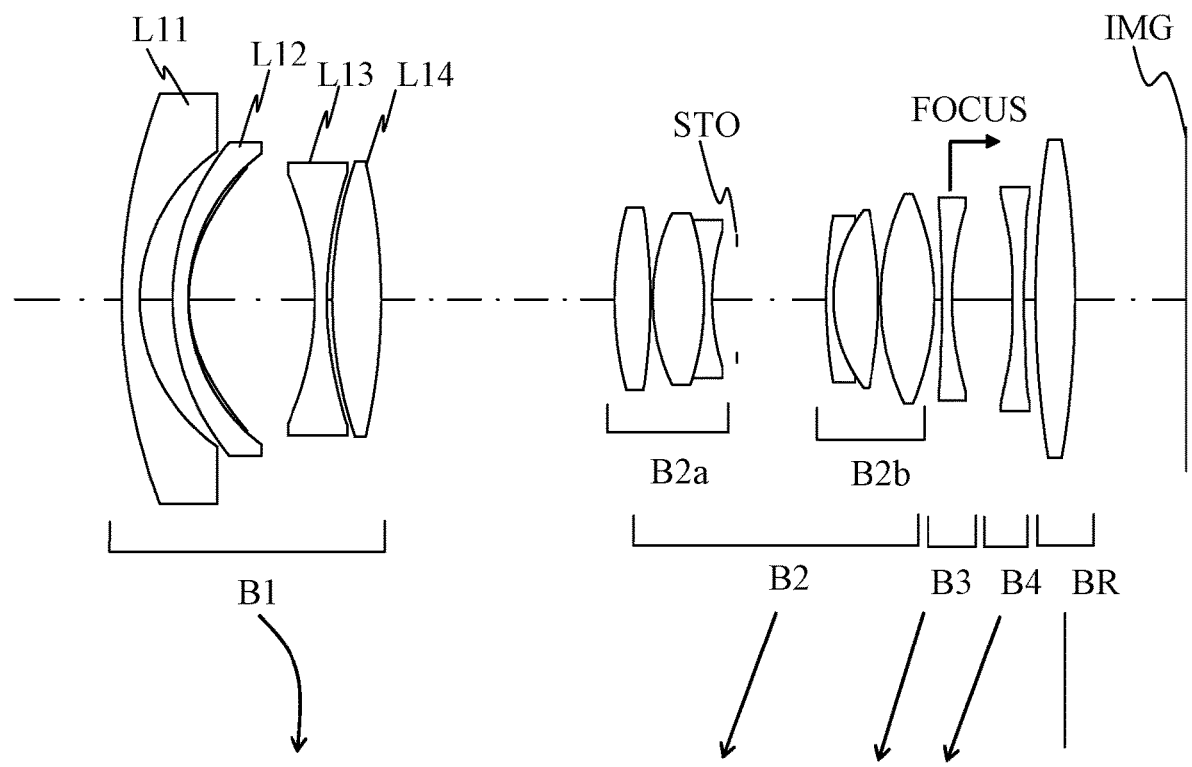
FIG. 1 is a sectional view of a zoom lens according to an Example 1.
Figure 2:
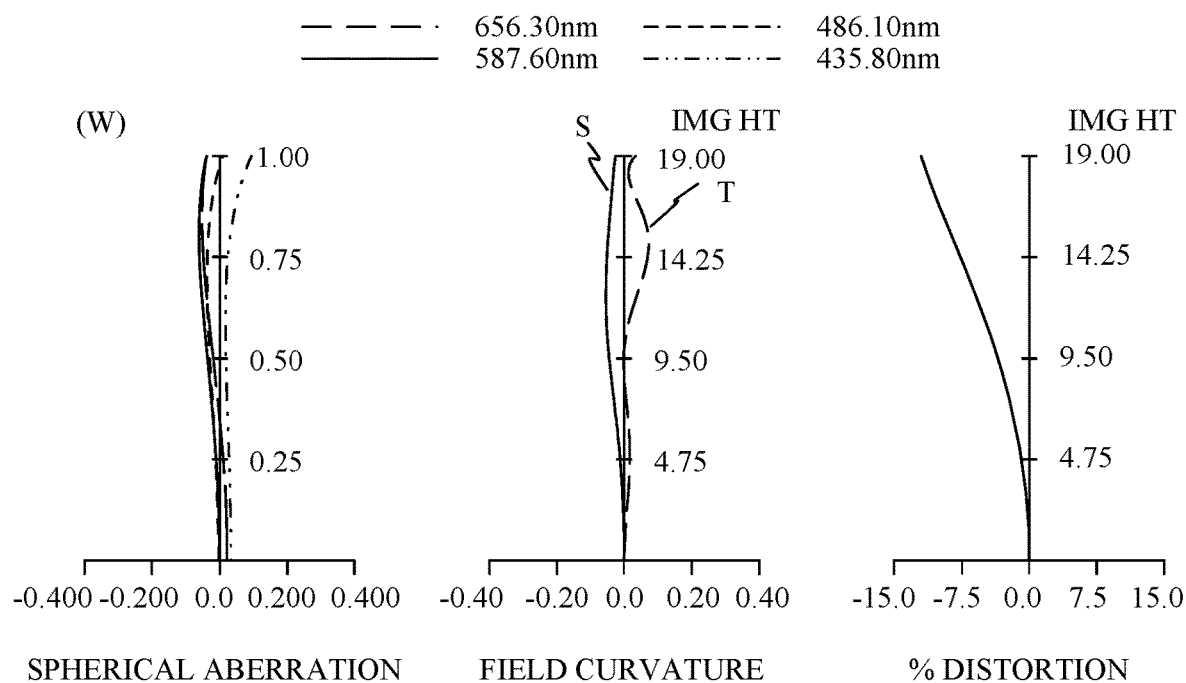
FIG. 2 is a longitudinal aberration diagram illustrating the zoom lens according to the Example 1.
Figure 2:
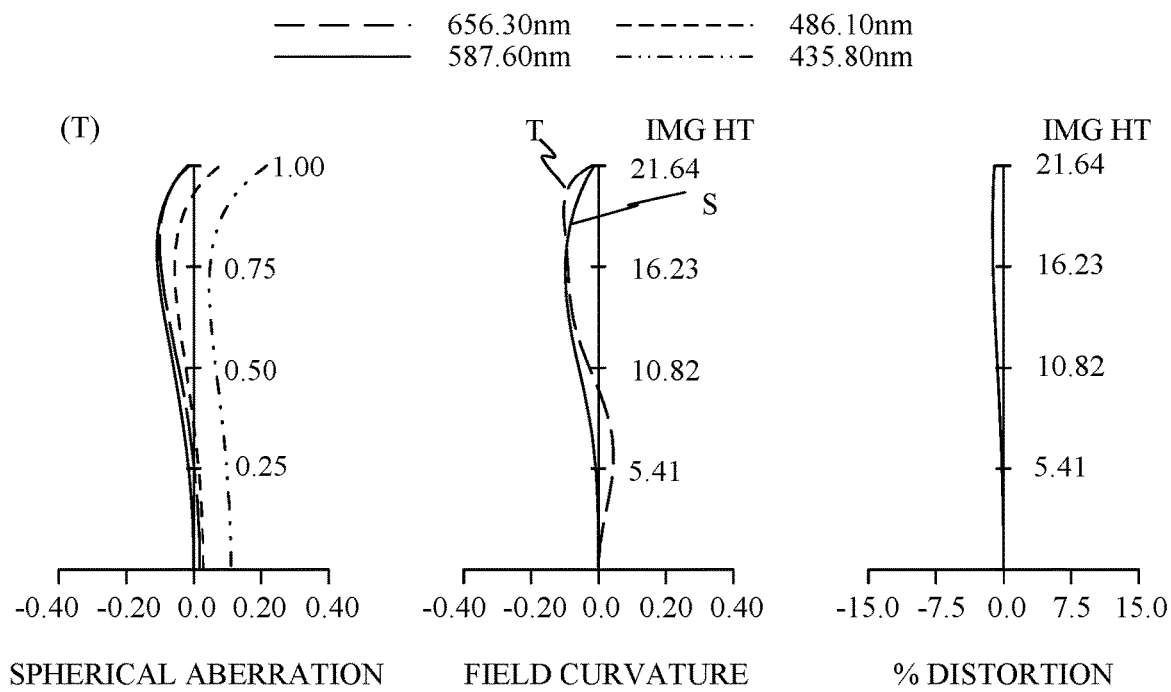

A zoom lens in the Example 1 illustrated in FIG. 1 has a wide angle of view with a half angle of view of 52.7° at the wide-angle end and is a bright zoom lens having an F-number of 2.8.

In the Example 1, during zooming from the wide-angle end to the telephoto end, the zooming is mainly performed by moving the first lens unit B1 to the image side, moving the second lens unit B2 to the object side, and thereby making a distance between the first lens unit B1 and the second lens unit B2 greatly vary. During zooming, the third and fourth lens units B3 and B4 also move, but the fifth lens unit BR does not move.

The second lens unit B2 includes, in order from the object side to the image side, a B2a sub-lens unit, or a first sub-lens unit, having a positive refractive power, a diaphragm STO, and a B2b sub-lens unit, or a second sub-lens unit, having a positive refractive power. In the Example 1, these are configured to integrally move. The B2a sub-lens unit and the B2b sub-lens unit each include at least one positive lens and at least one negative lens and the lenses are disposed symmetrically to each other with respect to the diaphragm STO. Thereby, an aberration variation is reduced during zooming.

The third lens unit B3 moves to the object side during zooming from the wide-angle end to the telephoto end and corrects an image plane variation. The third lens unit B3 also moves for focusing.

The fourth lens unit B4 includes one aspherical surface lens having a negative refractive power. This makes it easy for a zoom lens having a short back focus to correct field curvature. However, since the fourth lens unit B4 has the aspherical surface lens, optical performance is likely to be lowered by an eccentricity of the aspherical surface lens. Therefore, the fourth lens unit B4 is configured integrally with the second lens unit B2 so that relative position accuracy of the second and fourth lens units B2 and B4 is improved, and thereby the optical performance is hindered from being lowered by the eccentricity.

The fifth lens unit BR includes one lens having a weak positive refractive power. The fifth lens unit BR not moving with respect to an image plane img during zooming contributes to reducing an incident angle of light entering the image plane and reducing an overall lens length in a zoom lens having a short back focus.

The first lens unit B1 includes, in order from the object side to the image side, a negative meniscus lens L11, a negative lens element L12, a negative lens L13, and a positive lens L14. A good field curvature characteristic can be acquired by properly setting the refractive power of the first lens unit B1 in consideration of a relationship between an angle of view and a generated distortion amount. The "lens element" here is an optical element including a plurality of materials that are different from each other. For example, a lens element may be a lens made of inorganic material (first material) such as glass and a layer made of organic material (second material) such as resin provided on a surface of the lens.

The negative lens element L12 is an aspherical surface lens having a resin layer that has an aspherical surface and is formed on the image side of a spherical surface lens. This embodiment corrects well distortion, which increases as the zoom lens has a wider angle, by combining correction by image processing and a distortion reduction effect of the aspherical surface lens as the negative lens element L12. Increase in the number of pixels of the image sensor and high-speed image processing make it possible to perform image processing on captured images in real time. Therefore, an optical design of the zoom lens in this example is also made on a premise that the various aberrations are corrected by image processing.

Configurations of the zoom lenses in the Examples 2 to 5 described later are basically the same as the configuration of the zoom lens in the Example 1. However, in the zoom lens in the Example 4, during zooming from the wide-angle end to the telephoto end, a first lens unit B1 moves to the image side and thereafter moves to the object side. Further, in the zoom lens in the Example 5, during zooming from the wide-angle end to the telephoto end, a fifth lens unit B5 moves to the object side.

Figure 3:
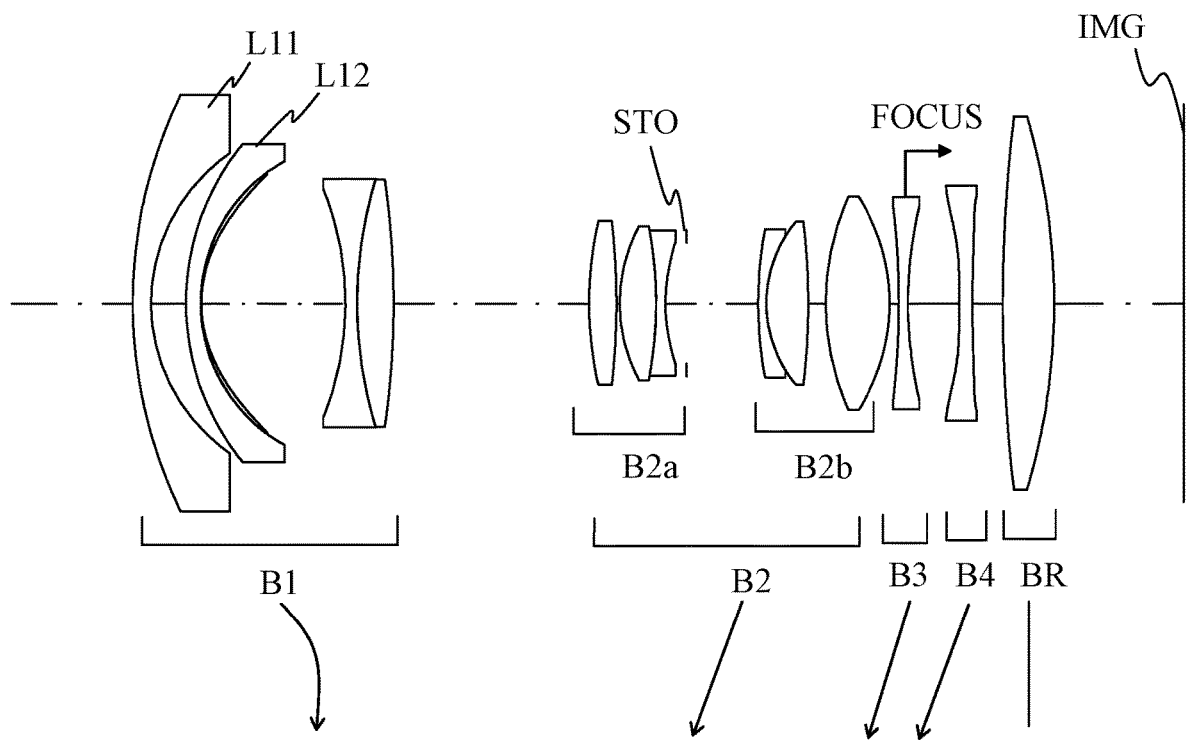
FIG. 3 is a sectional view of a zoom lens according to an Example 2.
Figure 4:
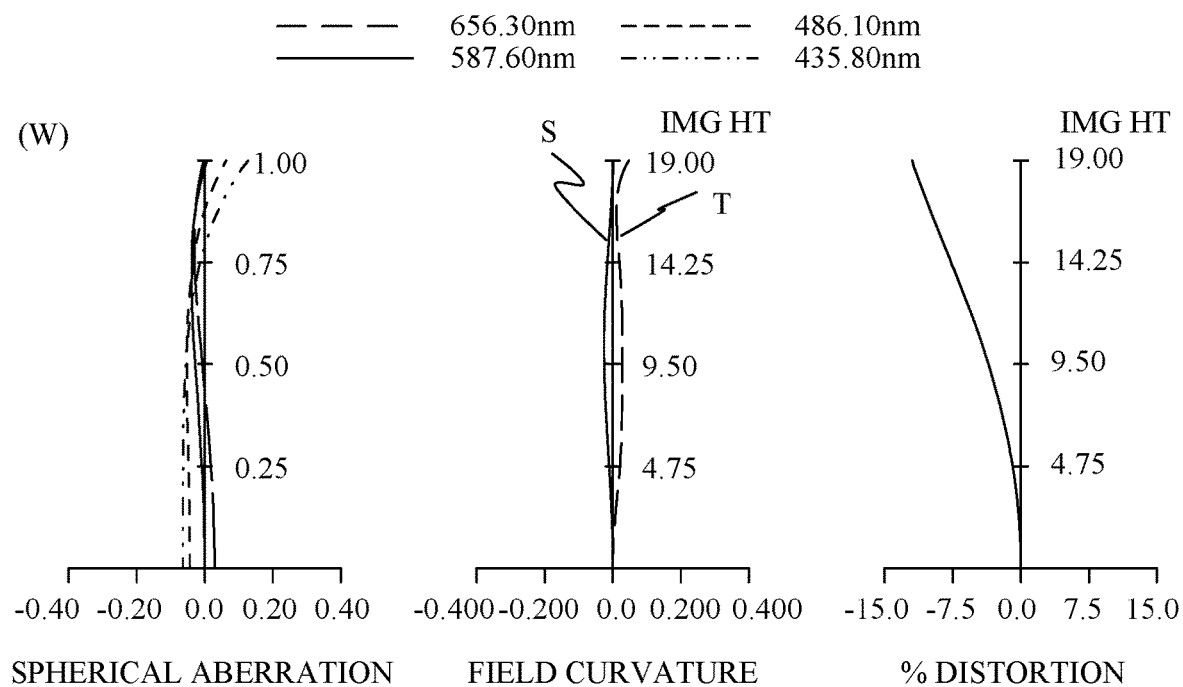
FIG. 4 is a longitudinal aberration diagram illustrating the zoom lens according to the Example 2.
Figure 4:
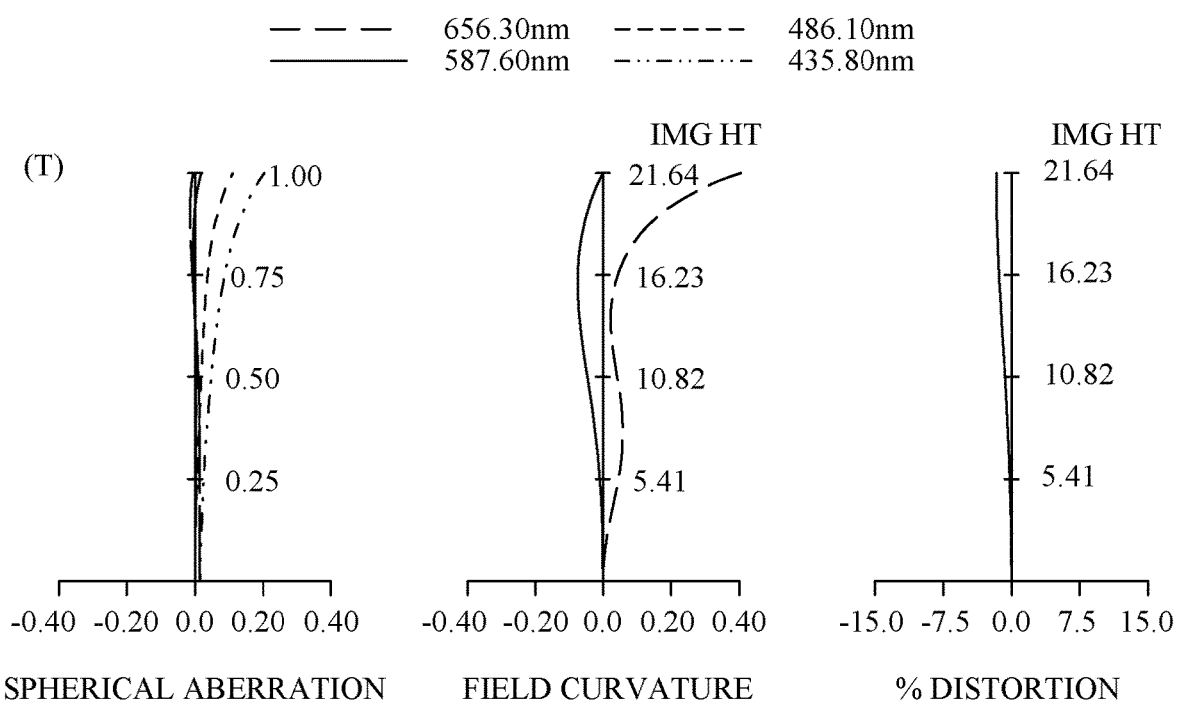

The zoom lens in the Example 2 illustrated in FIG. 3 has a wide angle of view with a half angle of view of 54.5° at the wide-angle end and is a bright zoom lens having an F-number of 2.8 to 4.0. In the zoom lens in the Example 2, the F-number at the telephoto end is made larger than that of the zoom lens in the Example 1, so that a lens diameter of the second lens unit B2 is reduced, and thereby an overall lens length is shortened.

Figure 5:
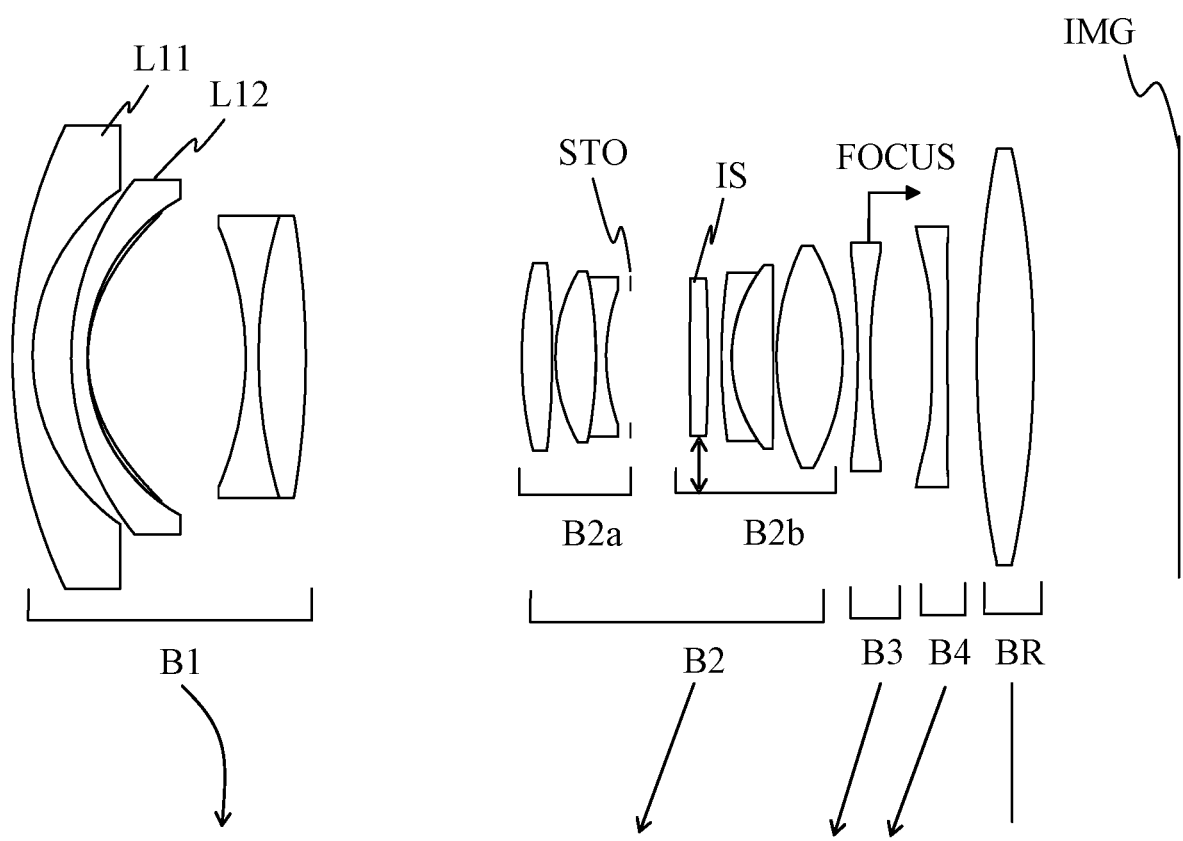
FIG. 5 is a sectional view of a zoom lens according to an Example 3.
Figure 6:
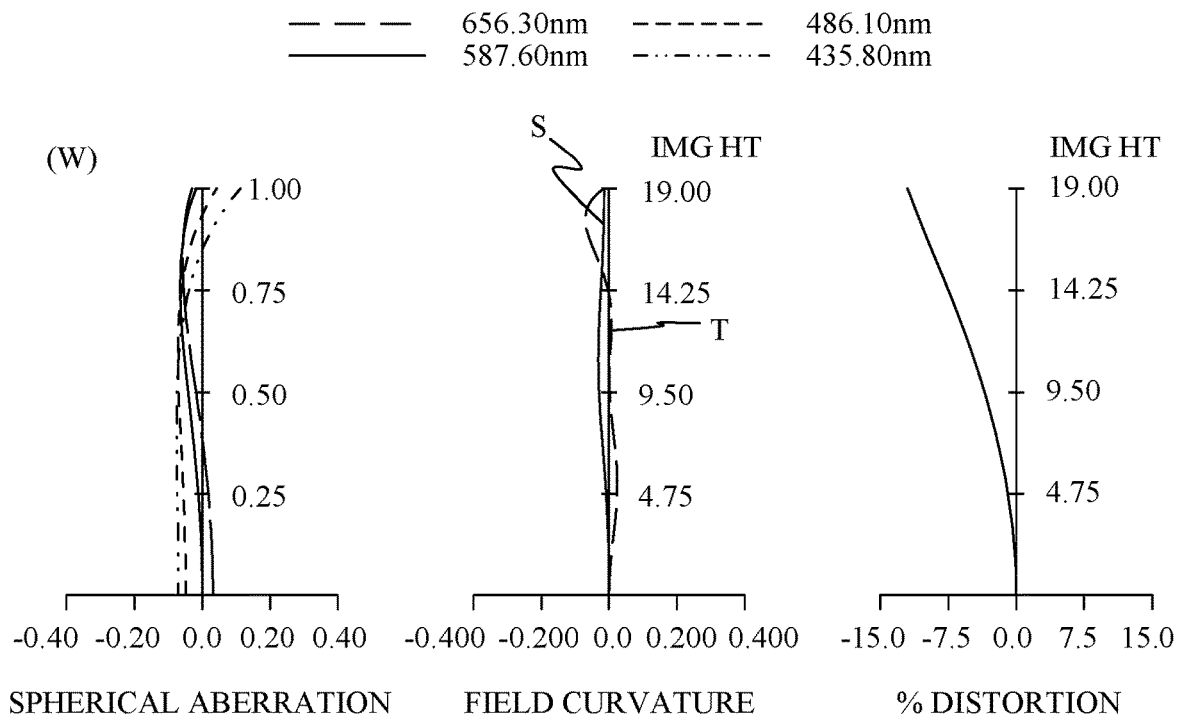
FIG. 6 is a longitudinal aberration diagram illustrating the zoom lens according to the Example 3.
Figure 6:
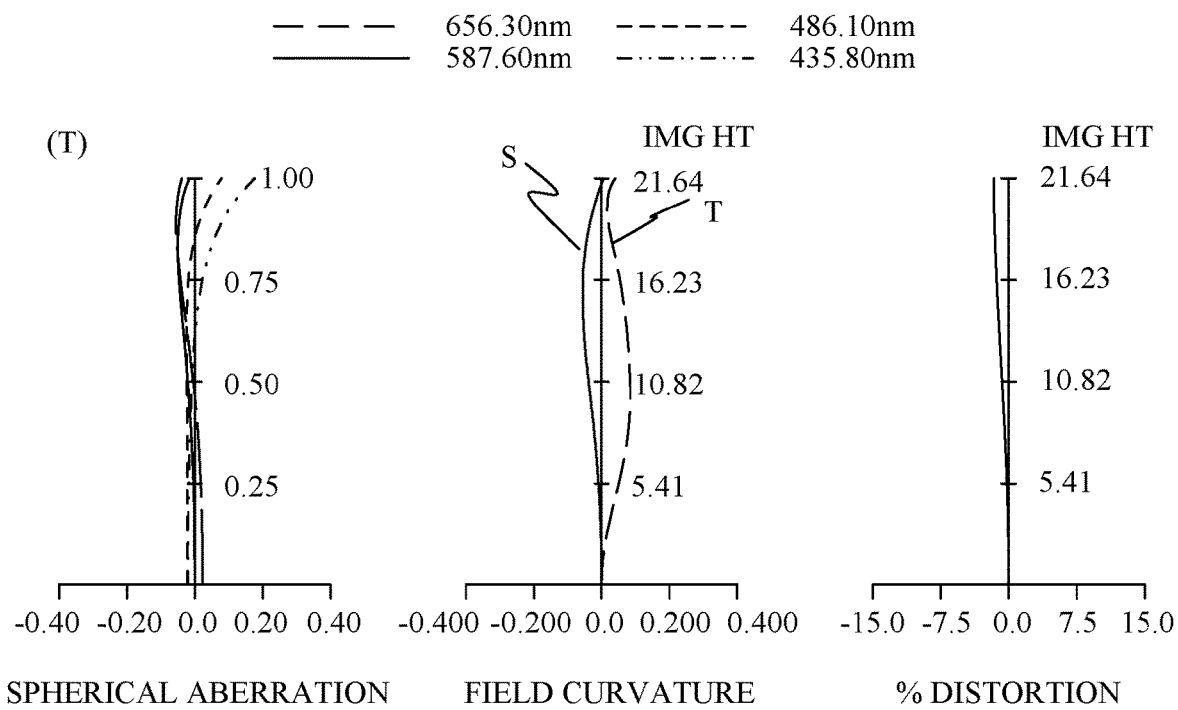

The zoom lens in the Example 3 illustrated in FIG. 5 has a wide angle of view with a half angle of view of 54.5° at the wide-angle end and is a bright zoom lens having an F-number of 2.8 to 4.0. The zoom lens in the Example 3 includes an image stabilization lens unit on the image side of the diaphragm STO in the second lens unit B2, the image stabilization lens unit being configured to correct image blur caused by camera shake or the like, by shifting in a direction orthogonal to an optical axis.

Figure 7:
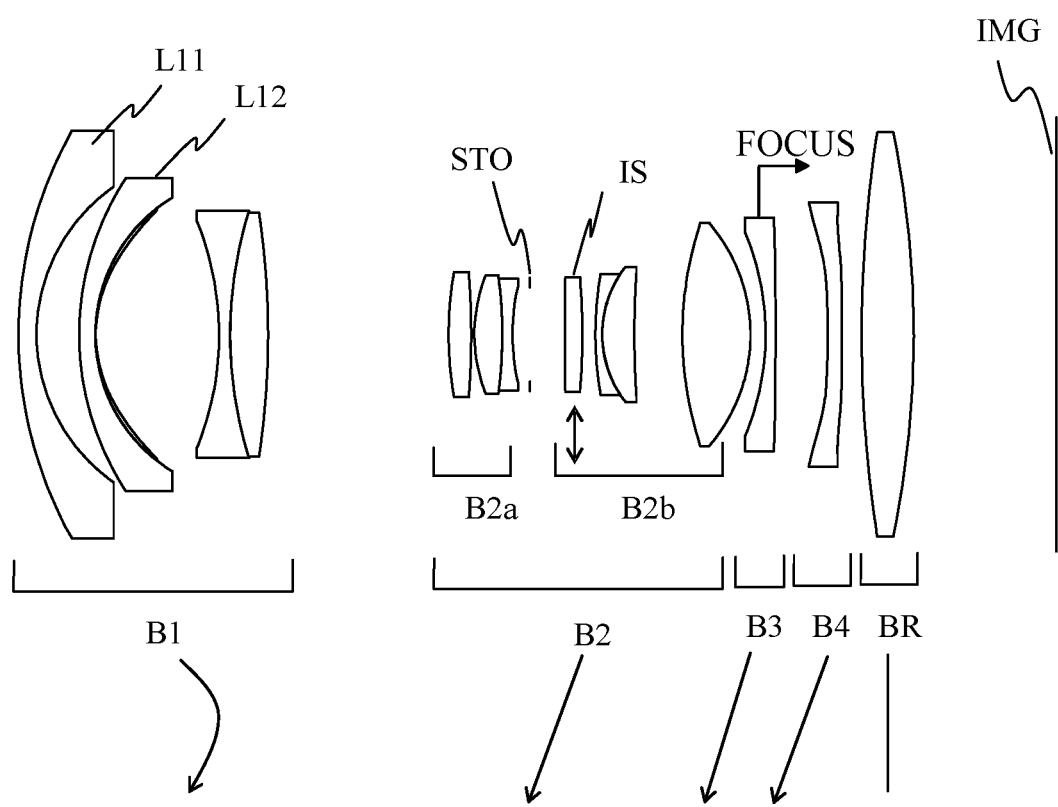
FIG. 7 is a sectional view of a zoom lens according to an Example 4.
Figure 8:
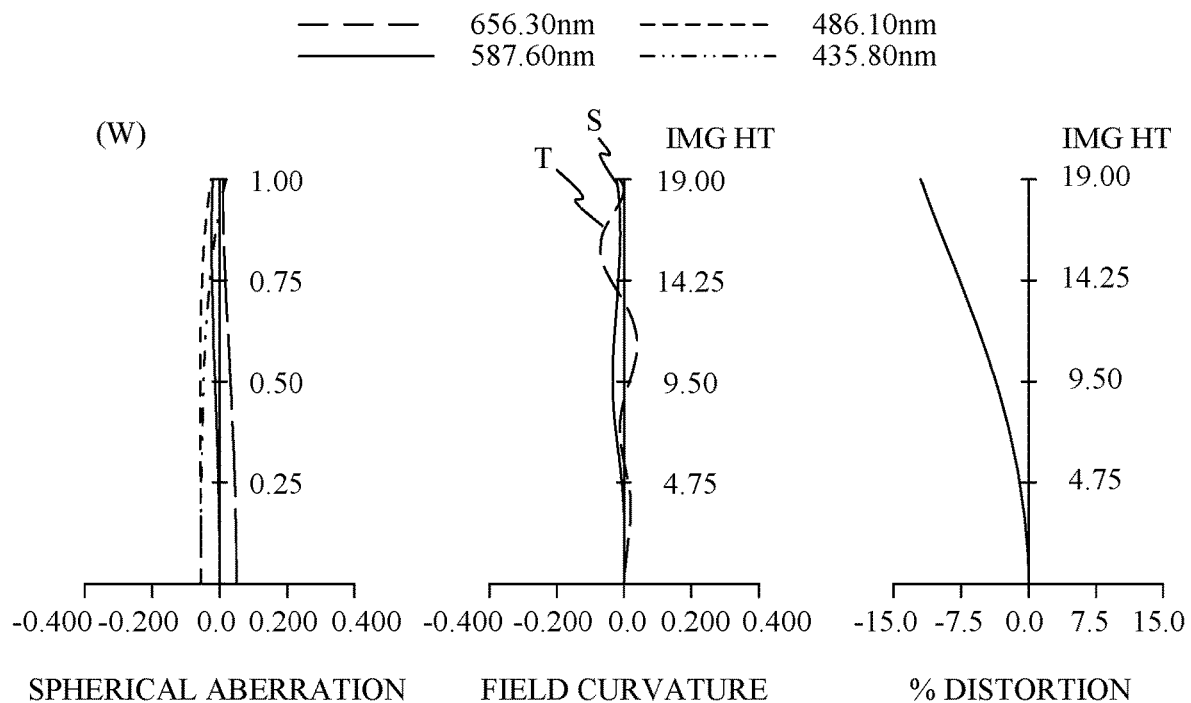
FIG. 8 is a longitudinal aberration diagram illustrating the zoom lens according to the Example 4.
Figure 8:
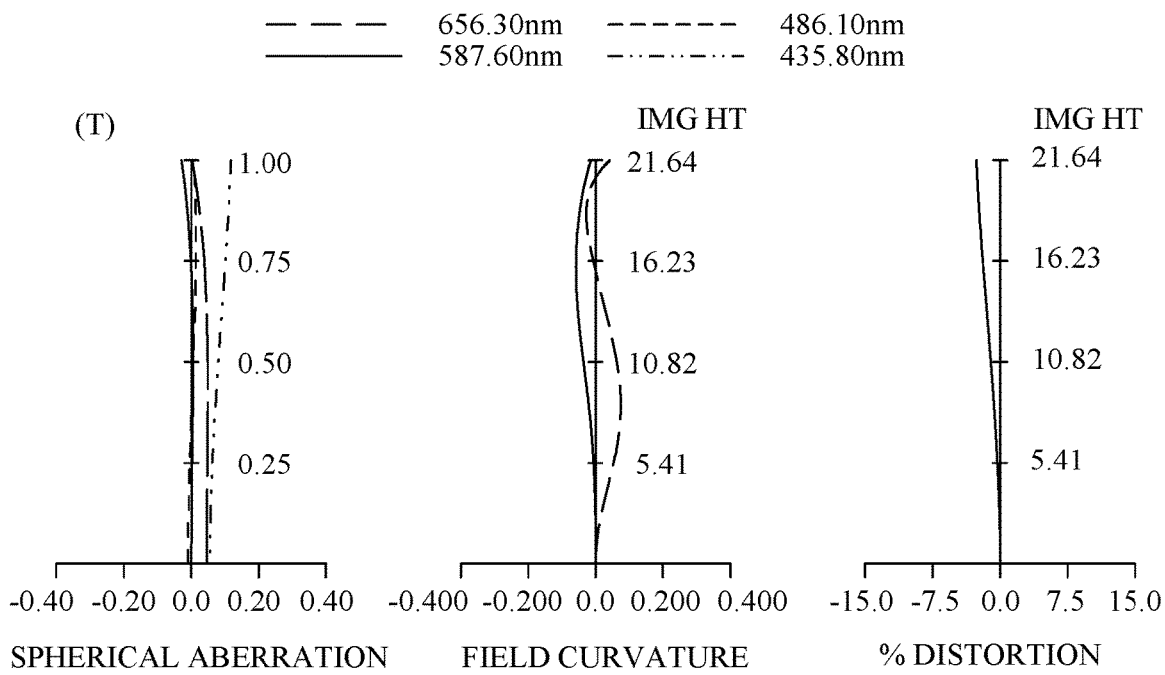

The zoom lens in the Example 4 illustrated in FIG. 7 has a wide angle of view with a half angle of view of 54.5° at the wide-angle end and is a bright zoom lens having an F-number of 3.5 to 5.6. An overall lens length of the zoom lens in the Example 4 is shorter than those of the respective zoom lenses in the other examples.

Figure 9:
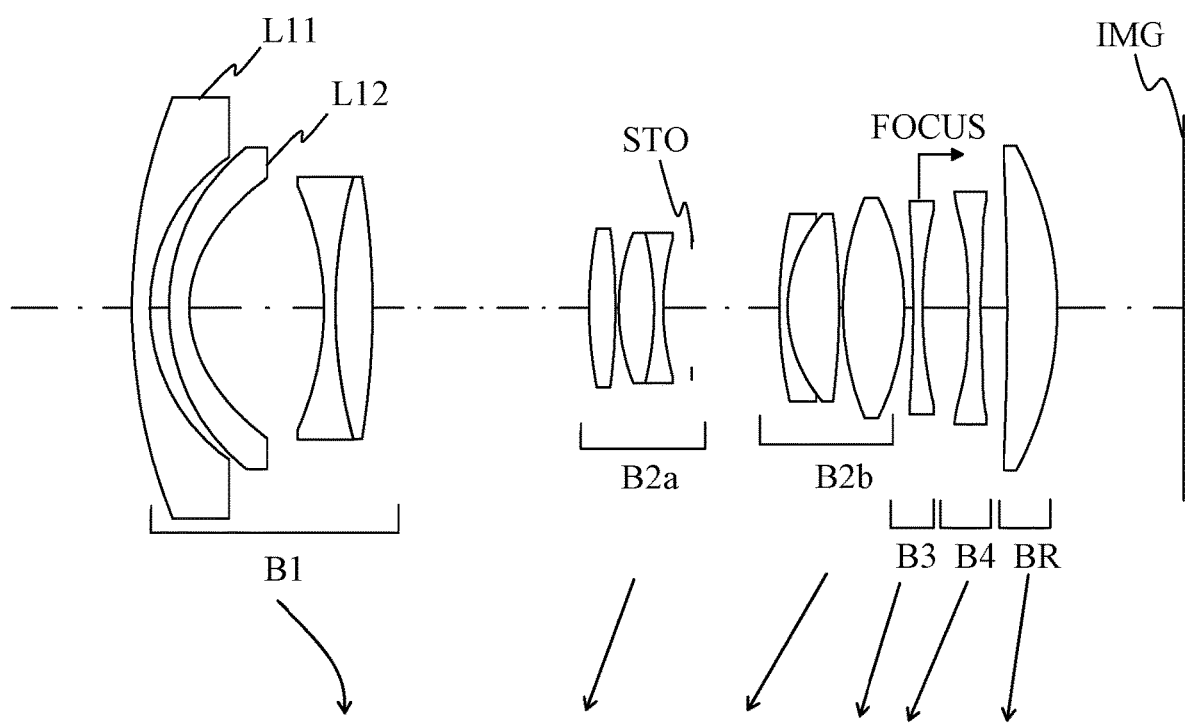
FIG. 9 is a sectional view of a zoom lens according to an Example 5.
Figure 10:
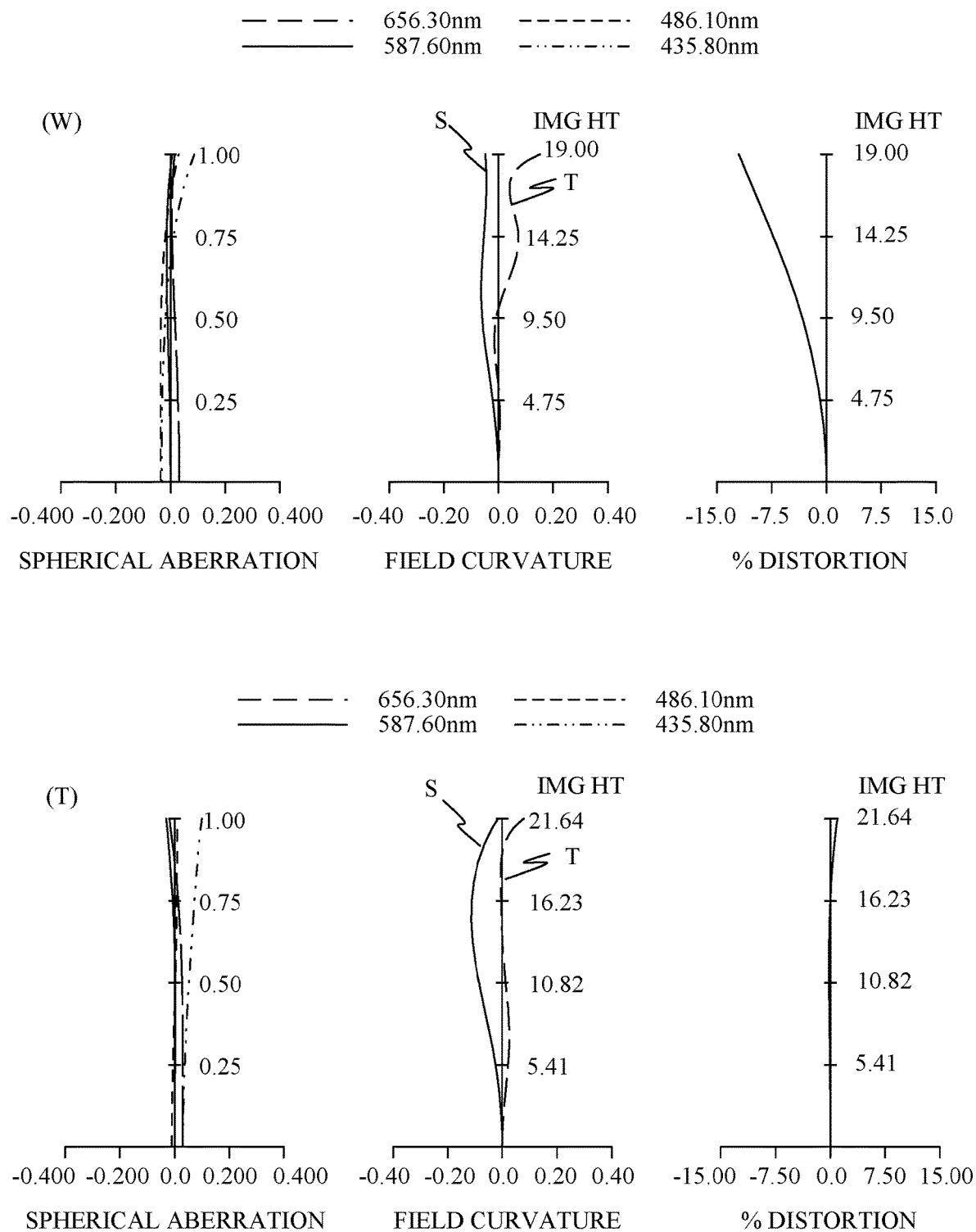
FIG. 10 is a longitudinal aberration diagram illustrating the zoom lens according to the Example 5.

The zoom lens in the Example 5 illustrated in FIG. 9 has a wide angle of view with a half angle of view of 54.5° at the wide-angle end and is a bright zoom lens having an F-number of 2.8 to 4.0. In the zoom lens in the Example 5, the B2a sub-lens unit including the diaphragm STO and the B2b sub-lens unit are divided and made to move independently from each other so as to draw different trajectories during zooming. As described above, the fifth lens unit BR moves to the object side with respect to the image plane img during zooming from the wide-angle end to the telephoto end.

With each of the above configuration, it is possible to realize a small-sized and wide-angle zoom lens which can correct various aberrations well while having a low level of manufacturing difficulty.

The zoom lens in each example may satisfy the following inequalities.

$$-3.7 \leq fg1/fw \leq -1.5 \quad (1)$$

$$-0.10 \leq mR/BFw \leq 0.30 \quad (2)$$

In the inequalities (1) and (2), fg1 represents a focal length of a lens closest to the object, i.e., a first lens, in the zoom lens, or the first lens unit B1, fw represents a focal length of the zoom lens at the wide-angle end, and mR represents a moving amount of the last lens unit BR during zooming from the wide-angle end to the telephoto end. The sign of the moving amount is positive when a position of the last lens unit BR at the telephoto end is closer to the object than a position of the last lens unit at the wide-angle end, and is negative when a position of the last lens unit BR at the telephoto end is closer to the image plane than the position of the last lens unit at the wide-angle end. BFw represents the back focus of the zoom lens at the wide-angle end.

The inequality (1) specifies a proper range of the refractive power of the first lens, and when this inequality is satisfied, it is possible to acquire a good field curvature characteristic while the size of the zoom lens is reduced. If fg1/fw is larger than the upper limit of the inequality (1), the refractive power of the first lens is too strong to correct the field curvature well. If fg1/fw is smaller than the lower limit of the inequality (1), the refractive power of the first lens is so weak that when the lens has a wide angle of view as in this embodiment, a lens diameter of the first lens becomes too large. In this case, a diameter of a lens filter attachable to a front end of the zoom lens increases, or the lens filter cannot be attached.

The inequality (2) specifies a proper range of a ratio between the moving amount of the last lens unit BR during zooming and the back focus. When the inequality (2) is satisfied, it is possible to shorten the overall lens length and to maintain a proper incident angle of light entering the image plane. If mR/BFw is larger than the upper limit of the inequality (2), the moving amount of the last lens unit BR is so large that the overall lens length is likely to be long with respect to a zooming ratio. When mR/BFw is smaller than the lower limit of the inequality (2), it is beneficial to shorten the overall lens length, but the incident angle of light entering the image plane is likely to increase, that is, an image plane incident angle characteristic deteriorates. Further, a lens diameter of the last lens unit BR becomes too large.

The zoom lens in each example may satisfy at least one of the following inequalities (3) to (14) while satisfying the inequalities (1) and (2).

During focusing from an infinite distance object to a close distance object, the third lens unit B3 as a focusing unit may move to the image side, and a focal length f3 of the third lens unit B3 and a focal length ft of the zoom lens at the telephoto end may satisfy the following inequality (3).

$$-4.00 \leq f3/ft \leq -0.65 \quad (3)$$

The inequality (3) specifies a proper range of a refractive power of the focusing unit, and when the inequality (3) is satisfied, it is possible to acquire a good imaging characteristic from an infinite distance end to a close distance end. If f3/ft is larger than the upper limit of the inequality (3), the refractive power of the focusing unit is so strong that the field curvature increases when the object distance changes. If f3/ft is smaller than the lower limit of the inequality (3), the moving amount of the focusing unit during focusing is so large that the overall lens length increases.

A focal length fR of the last lens unit BR and a focal length fw of the zoom lens at the wide-angle end may satisfy the following inequality (4).

$$3.0 \leq fR/fw \leq 12.0 \quad (4)$$

The inequality (4) specifies a proper range of the focal length of the last lens unit BR, and when the inequality (4) is satisfied, it is possible to shorten the overall lens length and to acquire a good image plane incident angle characteristic. If fR/fw is larger than the upper limit of the inequality (4), a positive refractive power of the last lens unit BR is so weak that the overall lens length cannot be shortened. If fR/fw is smaller than the lower limit of the inequality (4), the refractive power of the last lens unit BR is so strong that the negative refractive power of the lens units on the object side of the last lens unit BR is strengthen, worsening field curvature.

The overall lens length, that is, a distance Lw from the lens surface, i.e., the first surface, closest to the object to the image plane img at the wide-angle end and the focal length fw of the zoom lens at the wide-angle end may satisfy the following inequality (5).

$$5.0 \leq Lw/fw \leq 12.0 \quad (5)$$

The inequality (5) specifies a proper range of the overall lens length, and when the inequality (5) is satisfied, it is possible to achieve both the short overall lens length and high imaging performance. If Lw/fw is larger than the upper limit of the inequality (5), the refractive power of almost all lenses (or lenses units) are weakened and the imaging performance is improved, but it is disadvantageous for shortening the overall lens length. If Lw/fw is smaller than the lower limit of the inequality (5), the refractive power of each lens is so strong for the focal length at the wide-angle end that spherical aberration and field curvature cannot be satisfactorily corrected.

The overall lens length Lw at the wide-angle end and the back focus (air conversion value) BFw of the zoom lens at the wide-angle end may satisfy the following inequality (6).

$$5.0 \leq Lw/BF \leq 15.0 \quad (6)$$

The inequality (6) specifies a proper range of the back focus with respect to the overall lens length, and when the inequality (6) is satisfied, it is possible to achieve both small size and high performance in the refractive power arrangement in each example. If Lw/BF is larger than the upper limit of the inequality (6), the overall lens length is likely to increase. If Lw/BF is smaller than the lower limit of the inequality (6), it is difficult to arrange lenses with a proper refractive power arrangement, and to improve the performance.

A focal length f2 of the second lens unit B2 and the focal length fw of the zoom lens at the wide-angle end may satisfy the following inequality (7).

$$1.1 \leq f2/fw \leq 3.5 \quad (7)$$

The inequality (7) specifies a range of the focal length of the second lens unit B2, and when the inequality (7) is satisfied, it is possible to achieve both imaging performance and a high zoom ratio while the zoom lens has a large aperture diameter. If f2/fw is larger than the upper limit of the inequality (7), the refractive power of the second lens unit B2 is so weak that the moving amount of the second lens unit B2 increases so as to ensure a required zoom ratio, which causes increase in the overall lens length. If f2/fw is smaller than the lower limit of the inequality (7), it is easy to shorten the overall lens length with respect to the zoom ratio, but spherical aberration and axial chromatic aberration are likely to increase and it is difficult to increase the aperture diameter.

A thickness of the second lens unit B2 on the optical axis, that is, a distance D2 on the optical axis from a lens surface closest to the object in the second lens unit B2 to a lens surface closest to the image in the second lens unit B2, and the focal length fw of the zoom lens at the wide-angle end may satisfy the following inequality (8).

$$0.8 \leq D2/fw \leq 6.0 \quad (8)$$

The inequality (8) specifies a proper range of the thickness of the second lens unit B2 on the optical axis, and when the inequality (8) is satisfied, it is possible to correct well spherical aberration and color spherical aberration while the zoom lens has a large aperture diameter. If D2/fw is larger than the upper limit of the inequality (8), the imaging performance is improved, but the overall lens length is likely to increase. If D2/fw is smaller than the lower limit of the inequality (8), spherical aberration and its zoom variation cannot be sufficiently corrected.

Further, the second lens unit B2 may consist of, in order from the object side to the image side, the 2a sub-lens unit having the positive refractive power, the diaphragm STO, and the 2b sub-lens unit having the positive refractive power. The second lens unit B2 is a main zooming unit, and thus when the sub-lens units having the positive refractive powers are arranged symmetrically to each other with respect to the diaphragm STO, it is possible to cancel aberration variation caused by zooming and to reduce an aberration variation over the entire zoom area.

A focal length f2a of the 2a sub-lens unit and a focal length f2b of the 2b sub-lens unit may satisfy the following inequality (9).

$$0.8 \leq f2a/f2b \leq 5.0 \quad (9)$$

The inequality (9) specifies a proper range of the refractive power arrangements of front and back of the diaphragm in the second lens unit B2, and when the inequality (9) is satisfied, it is possible to reduce variations in spherical aberration and field curvature in the entire zoom area, and to acquire high imaging performance, while the zoom lens has a large aperture diameter. If f2a/f2b is larger than the upper limit of the inequality (9), the refractive power on the image side of the diaphragm STO is strong, and it is easy to increase the aperture diameter, but the overall lens length is likely to increase. If f2a/f2b is smaller than the lower limit of the inequality (9), the refractive power on the object side of the diaphragm STO is strong, and it is difficult to reduce a variation in field curvature during zooming and to increase the aperture diameter.

An Abbe number vdg1 of material of the negative lens, i.e., the first lens, closest to the object in the zoom lens may satisfy the following inequality (10).

$$15 \leq vdg1 \leq 40 \tag{10}$$

The inequality (10) specifies a proper range of the Abbe number of the first negative lens, and when the inequality (10) is satisfied, it is possible to correct lateral chromatic aberration well at the time of correcting distortion correction. If vdg1 is larger than the upper limit of the inequality (10), an effect of correcting second-order lateral chromatic aberration decreases. If vdg1 is smaller than the lower limit of the inequality (10), first-order lateral chromatic aberration cannot be sufficiently corrected.

A refractive power Ndg1 at the d-line (587.56 nm) of the material of the first lens may satisfy the following inequality (11).

$$1.8 \leq Ndg1 \leq 2.1 \tag{11}$$

The inequality (11) specifies a range of the refractive power of the first lens, and when the inequality (11) is satisfied, it is possible to correct field curvature well while the zoom lens has a wider angle. If Ndg1 is larger than the upper limit of the inequality (11), it is beneficial for correcting field curvature, but it is difficult to acquire glass having a stable characteristic. If Ndg1 is smaller than the lower limit of the inequality (11), a curvature of the first lens is so large that field curvature increases.

The first lens unit B1 may include, in order from the object side to the image side, a first lens element L11, which is a negative meniscus lens, and a second lens element L12, which is a negative lens element, and an average refractive index Nd11 at the d-line of the first lens element and an average refractive index Nd12 at the d-line of the second lens element may satisfy the following inequality (12).

$$1.01 \leq Nd11/Nd12 \leq 1.50 \tag{12}$$

The inequality (12) specifies a range of a ratio between the refractive powers of the first lens element and the second lens element, and when the inequality (12) is satisfied, it is possible to acquire a small-sized and wide-angle zoom lens having a high image plane characteristic. If Nd11/Nd12 is larger than the upper limit of the inequality (12), the refractive power of the first lens element increases for acquiring a wide angle, making it difficult to correct field curvature. If Nd11/Nd12 is smaller than the lower limit of the inequality (12), a lens diameter of each lens element is likely to be large.

An average Abbe number vd11 with respect to the d-line of the first lens element L11 and an average Abbe number vd12 with respect to the d-line of the second lens element L12 may satisfy the following inequality (13).

$$0.3 \leq vd11/vd12 \leq 0.9 \tag{13}$$

The inequality (13) specifies a range of a ratio between the Abbe numbers of the first and second lens elements L11 and L12, and when the inequality (13) is satisfied, it is possible to correct field curvature and lateral chromatic aberration well with respect to an amount of generated distortion. If vd11/vd12 is larger than the upper limit of the inequality (13), it is necessary to weaken the refractive power of the first lens element, which makes it difficult to correct field curvature well or makes the lens diameter large. If vd11/vd12 is smaller than the lower limit of the inequality (13), the refractive power of the first lens element increases for acquiring a necessary angle of view, making it difficult to correct field curvature well.

A distortion amount distw of the zoom lens at the wide-angle end may satisfy the following inequality (14).

$$-7 \leq distw \leq -30 \tag{14}$$

The inequality (14) specifies a range of the amount of distortion generated at the wide-angle end, and when the inequality (14) is satisfied, it is possible to acquire a good image captured by using the zoom lens while the zoom lens has a small size. If distw is larger than the upper limit of the inequality (14), when distortion correction is performed by image processing, a stretching magnification is so large that resolution after image correction is greatly deteriorated, and a good captured image cannot be acquired. If distw is smaller than the lower limit of the inequality (14), in order to correct distortion, an aspherical surface lens with high level of manufacturing difficulty is used, or to add a negative lens on the object side of the aspherical surface lens and the lens diameter increases.

The numerical ranges of the above-described inequalities (1) to (14) may be set as follows.

$$-3.4 \leq fg1/fw \leq -1.7 \tag{1a}$$

$$-3.0 \leq fg1/fw \leq -2.0 \tag{1b}$$

$$-0.05 \leq mR/BFw \leq 0.25 \tag{2a}$$

$$0.00 \leq mR/BFw \leq 0.23 \tag{2b}$$

$$-3.0 \leq f3/ft \leq -0.68 \tag{3a}$$

$$-2.0 \leq f3/ft \leq -0.70 \tag{3b}$$

$$4.0 \leq fR/fw \leq 10.0 \tag{4a}$$

$$5.0 \leq fR/fw \leq 9.0 \tag{4b}$$

$$5.2 \leq Lw/fw \leq 11.0 \tag{5a}$$

$$5.5 \leq Lw/fw \leq 10.0 \tag{5b}$$

$$5.5 \leq Lw/BFw \leq 13.0 \tag{6a}$$

$$5.6 \leq Lw/BFw \leq 11.0 \tag{6b}$$

$$1.2 \leq f2/fw \leq 3.0 \tag{7a}$$

$$1.3 \leq f2/fw \leq 2.5 \tag{7b}$$

$$1.0 \leq D2/fw \leq 5.0 \tag{8a}$$

$$1.2 \leq D2/fw \leq 4.5 \tag{8b}$$

$$1.0 \leq f2a/f2b \leq 4.0 \tag{9a}$$

$$1.1 \leq f2a/f2b \leq 3.0 \tag{9b}$$

$18 \leq \nu dg1 \leq 37$ (10a)

$20 \leq \nu dg1 \leq 35$ (10b)

$1.85 \leq Ndg1 \leq 2.00$ (11a)

$1.87 \leq Ndg1 \leq 1.98$ (11b)

$1.05 \leq Nd11/Nd12 \leq 1.30$ (12a)

$1.10 \leq Nd11/Nd12 \leq 1.25$ (12b)

$0.4 \leq \nu d11/\nu d12 \leq 0.8$ (13a)

$0.45 \leq \nu d11/\nu d12 \leq 0.7$ (13b)

$-8.5 \leq distw \leq -25$ (14a)

$-10 \leq distw \leq -20$ (14b)

In each example, a description has been given of the zoom lens including five units, but if the same effect as in each example can be acquired, one or more lens units may be disposed between the fourth lens unit and the last lens unit. Further, a lens unit having a weak refractive power may be disposed on the object side or image side of the zoom lens in each example.

Examples of specific values of respective examples are given below as numerical examples. f represents a focal length (mm), F represents an F-number, imgφ represents an image circle diameter (mm), and ω represents a half angle of view (°). A surface number indicates an order of a lens surface or a diaphragm surface counted from the object side to the image side, and the diaphragm surface is indicated by adding "s" to the left side of the surface number. IMG represents an image plane.

B represents an order of a lens unit counted from the object side to the image side as described above. IS is attached to an image stabilization lens unit which moves in a direction orthogonal to the optical axis so as to correct image blur caused by camera shake. R represents a curvature radius (mm) of an i-th lens surface, d represents a distance (mm) on the optical axis between the i-th surface and an i+1-th surface, and a parenthesized distance represents a distance between lens units. nd and vd represent a refractive index at the d-line and an Abbe number with respect to the d-line of glass material between the i-th surface and the i+1-th surface, respectively.

Abbe number vd is expressed by the following expression where Nd, NF, and NC represent refractive indexes at the d-line (587.6 nm), F-line (486.1 nm), and C-line (656.3 nm) of the Fraunhofer lines, respectively.

$\nu d = (Nd-1)/(NF-NC)$

"*" attached on the right side of the surface number of a lens surface indicates that the lens surface has an aspherical surface shape that follows the following function, and the numerical example describes coefficients in the function. "e-x" of an aspherical surface coefficient represent $10^{-x}$. An aspherical surface shape is expressed by the following function, where x represents a coordinate in the optical axis direction with respect to a surface vertex of the lens surface, y represents a coordinate in a radial direction with respect to the surface vertex of the lens surface, light entering direction is positive, r represents a paraxial curvature radius, K represents a conic constant, and A to G represent aspherical surface coefficients. "e-x" represents $\times 10^{-x}$.

$$x = (y^2/r)/[1+\{1-(1+K)(y^2/r^2)\}^{1/2}] + Ay^4 + By^6 + Cy^8 + Dy^{10} + Ey^{12} + Fy^{14} + Gy^{16}$$

A focal length (mm) and an F-number (FNO) in each table of various data are values when an infinite distance object is in focus. A real image height (mm) represents an image height including distortion of an image. In each example, it is assumed that distortion of an image caused by distortion aberration is corrected by image processing for a captured image. An overall length (mm) as the overall lens length represents a distance on the optical axis from the first surface to the image plane, the first surface being a lens surface closest to the object. A back focus BF (mm) represents a distance from a lens surface, or a last lens surface, closest to the image to the image plane, and is an air conversion length calculated by excluding an element not having a refractive power such as a flat plate if there is such an element between the last lens surface and the image plane. The overall length is acquired by adding the back focus to a distance on the optical axis from the first surface to the last lens surface.

FIG. 2, FIG. 4, FIG. 6, FIG. 8, and FIG. 10 illustrate aberration diagrams at the wide-angle ends (W) and telephoto ends (T) of the zoom lenses in the Examples 1 to 5, respectively. In each spherical aberration diagram, a solid line represents spherical aberration at the d-line, a broken line represents spherical aberration at the F-line, a rough broken line represents spherical aberration at the C-line, and a two-dot-chain line represents spherical aberration at the g-line (435.83 nm). A scale on a horizontal axis indicates a defocus amount, and is −0.4 to +0.4 [mm]. In each astigmatism diagram, a solid line represents astigmatism in a sagittal image plane, and a dotted line represents field curvature in a meridional image plane. A horizontal axis is the same as that in the spherical aberration diagram. In each distortion diagram, a scale on a horizontal axis is −15 to +15 [%]. Distortion at the d-line is illustrated.

Table 1 summarizes values corresponding to the above-described inequalities (1) to (14) in the Numerical Examples 1 to 5. Table 1 also summarizes a moving amount of each lens unit. In the table indicating the moving amounts, a moving amount of a "second lens unit" in the Example 5 is a moving amount of the B2a sub-lens unit, a moving amount of a "third lens unit" is a moving amount of the B2b sub-lens unit, a moving amount of a "fourth lens unit" is a moving amount of the third lens unit B3, a moving amount of a "fifth lens unit" is a moving amount of the fourth lens unit B4, and a moving amount of a "sixth lens unit" is a moving amount of the fifth lens unit BR.

Numerical Example 1

| | | | | | | | |
|---|---|---|---|---|---|---|---|
| UNIT: mm |||||||||
| SURFACE DATA |||||||||
| \|f\| = 16.45-27.50 F/2.88-2.88 imgφ = 43.2 ω(°) = 52.7-46.4 |||||||||
| B | Surface No. | Effective Diameter | Curvature R | Distance d | glass | nd | vd |
| | OBJ | | | (INF) | | | |
| 1 | 1 | 48.88 | 72.0573 | 2.3000 | TAFD25 | 1.90366 | 31.31 |
| | 2 | 37.35 | 22.7677 | 4.1000 | | | |
| | 3 | 37.03 | 30.9924 | 2.0000 | SLAL59 | 1.73400 | 51.47 |

-continued

| UNIT: mm SURFACE DATA |f| = 16.45-27.50 F/2.88-2.88 imgφ = 43.2 ω(°) = 52.7-46.4 | | | | | | |
|---|---|---|---|---|---|---|---|
| | 4 | 33.85 | 23.0000 | 0.0500 | — | 1.51690 | 52.05 |
| | 5* | 33.73 | 18.6002 | 16.0000 | | | |
| | 6 | 31.46 | −37.6431 | 1.5000 | SFPL51 | 1.49700 | 81.54 |
| | 7 | 32.14 | 50.5954 | 0.6700 | | | |
| | 8 | 32.42 | 53.7196 | 6.2000 | SLAH60 | 1.83400 | 37.16 |
| | 9 | 32.36 | −78.0582 | (29.510) | | | |
| 2 | 10 | 21.11 | 45.6685 | 4.5000 | SLAH55VS | 1.83481 | 42.74 |
| | 11 | 20.88 | −77.9643 | 0.3000 | | | |
| | 12 | 19.84 | 25.5851 | 6.5000 | SFPL51 | 1.49700 | 81.54 |
| | 13 | 18.22 | −34.6848 | 1.0000 | SLAH89 | 1.85150 | 40.78 |
| | 14 | 17.25 | 29.7162 | 3.1000 | | | |
| | s15 | 13.50 | 1e+018 | 8.8000 | | | |
| | 16 | 17.60 | 1e+018 | 2.5000 | | | |
| | 17 | 18.69 | 64.0517 | 0.9000 | SLAH89 | 1.85150 | 40.78 |
| | 18 | 19.26 | 18.3765 | 5.7000 | SFPL51 | 1.49700 | 81.54 |
| | 19 | 20.59 | −54.3564 | 0.3000 | | | |
| | 20 | 24.12 | 30.6883 | 6.8000 | SFPM2 | 1.59522 | 67.73 |
| | 21 | 24.46 | −33.7579 | (1.0000) | | | |
| 3 | 22 | 23.69 | −170.2806 | 1.2000 | STIM25 | 1.67270 | 32.10 |
| | 23 | 23.53 | 38.9642 | (7.6821) | | | |
| 4 | 24* | 24.90 | −1000.0000 | 1.4000 | E48R | 1.53113 | 55.75 |
| | 25* | 26.20 | 60.0000 | (1.4916) | | | |
| 5 | 26 | 36.96 | 129.9004 | 5.0000 | SBSM18 | 1.63854 | 55.38 |
| | 27 | 37.71 | −120.3104 | | | | |
| | IMG | | | | | | |

Aspherical-data (A4, B6, C8, D10, E12, F16)

Surface 5 r = 1.86002e+001 K = −6.34869e−001 A = −6.48612e−006 B = −6.59728e−009
C = −2.39986e−011 D = 6.99611e−014 E = −1.79260e−016 F = 4.77894e−022
Surface 24 r = −1.00000e+003 K = 0.00000e+000 A = −1.47459e−004 B = 9.59827e−007
C = −2.80979e−009 D = 2.71484e−012 E = 6.18596e−015 F = 0.00000e+000
Surface 25 r = 6.00000e+001 K = 0.00000e+000 A = −1.22418e−004 B = 9.83492e−007
C = −3.30364e−009 D = 5.32196e−012 E = 0.00000e+000 F = 0.00000e+000

| VARIOUS DATA | | | |
|---|---|---|---|
| | WIDE | MIDDLE | TELE |
| Focal Length: | 16.45 | 21.00 | 27.50 |
| FNO: | 2.88 | 2.88 | 2.88 |
| Half Angle of View: | 52.71 | 46.44 | 38.49 |
| Image Height: | 19.00 | 21.00 | 21.64 |
| Overall Length: | 134.57 | 124.99 | 119.35 |
| BF: | 14.07 | 14.07 | 14.07 |

| UNIT DISTANCE DATA | | | | | | |
|---|---|---|---|---|---|---|
| | WIDE | MIDDLE | TELE | WIDE Close | MIDDLE Close | TELE Close |
| d0 | 1e+020 | 1e+020 | 1e+020 | 145.4333 | 155.0143 | 160.9400 |
| d9 | 29.5098 | 14.5445 | 1.5000 | | | |
| d21 | 1.0000 | 1.7743 | 2.8064 | 2.0147 | 3.0519 | 4.5042 |
| d23 | 7.6821 | 6.9078 | 5.8778 | 6.7874 | 5.8200 | 4.4272 |
| d25 | 1.4916 | 6.8600 | 14.2955 | | | |

| UNIT DATA | | |
|---|---|---|
| Unit | Starting Surface | Focal Length |
| B1 | 1 | −31.8771 |
| B2 | 10 | 31.7971 |
| B3 | 22 | −47.0280 |
| B4 | 24 | −106.5237 |
| B5 | 26 | 98.5863 |

Numerical Example 2

UNIT: mm
SURFACE DATA
|f| = 15.40-27.50  F/2.88-4.04  imgφ = 43.2  ω(°) = 54.5-46.4

| B | Surface No. | Effective Diameter | Curvature R | Distance d | glass | nd | νd |
|---|---|---|---|---|---|---|---|
|   | OBJ |   |   | (INF) |   |   |   |
| 1 | 1 | 42.60 | 51.9513 | 2.0000 | SLAH95 | 1.90366 | 31.34 |
|   | 2 | 32.71 | 19.9351 | 3.8000 |   |   |   |
|   | 3 | 32.26 | 27.4775 | 1.6000 | SLAL59 | 1.73400 | 51.47 |
|   | 4 | 28.36 | 17.7177 | 0.0500 | — | 1.51690 | 52.05 |
|   | 5* | 28.21 | 14.0645 | 15.7500 |   |   |   |
|   | 6 | 24.96 | −33.3529 | 1.2500 | SFPL51 | 1.49700 | 81.54 |
|   | 7 | 24.84 | 45.8701 | 4.0000 | SLAH93 | 1.90525 | 35.04 |
|   | 8 | 24.67 | −92.5540 | (20.7890) |   |   |   |
| 2 | 9 | 16.21 | 1e+018 | 0.5000 |   |   |   |
|   | 10 | 16.31 | 40.4620 | 3.0000 | SLAH92 | 1.89190 | 37.13 |
|   | 11 | 16.13 | −75.8476 | 0.3000 |   |   |   |
|   | 12 | 15.28 | 17.7026 | 4.0000 | SFPL51 | 1.49700 | 81.54 |
|   | 13 | 14.39 | −43.0344 | 1.0000 | SLAH89 | 1.85150 | 40.78 |
|   | 14 | 13.42 | 21.0175 | 2.3000 |   |   |   |
|   | s15 | 13.31 | 1e+018 | 6.7500 |   |   |   |
|   | 16 | 13.16 | 1e+018 | 1.0000 |   |   |   |
|   | 17 | 14.14 | 43.5120 | 0.9000 | SLAH89 | 1.85150 | 40.78 |
|   | 18 | 14.72 | 13.9534 | 4.6000 | SFPL51 | 1.49700 | 81.54 |
|   | 19 | 16.19 | −69.3687 | 1.8694 |   |   |   |
|   | 20 | 20.62 | 28.7399 | 7.0000 | SFPL51 | 1.49700 | 81.54 |
|   | 21 | 21.35 | −21.5079 | (1.0000) |   |   |   |
| 3 | 22 | 21.06 | −90.5020 | 1.0000 | STIM22 | 1.64769 | 33.79 |
|   | 23 | 21.20 | 45.9721 | (5.5791) |   |   |   |
| 4 | 24* | 22.31 | −1000.0000 | 1.4000 | E48R | 1.53113 | 55.75 |
|   | 25* | 23.54 | 61.3808 | (3.3130) |   |   |   |
| 5 | 26 | 37.24 | 168.5557 | 5.6000 | SBSL7 | 1.51633 | 64.14 |
|   | 27 | 38.03 | −71.6797 |   |   |   |   |
|   | IMG |   |   |   |   |   |   |

Aspherical-data (A4, B6, C8, D10, E12, F16)

Surface 5 r = 1.40645e+001  K = −7.15928e−001  A = −6.98900e−006  B = −1.80701e−008
C = 4.31189e−011  D = −7.79229e−013  E = 3.11218e−015  F = −6.08887e−018
Surface 24 r = −1.00000e+003  K = 0.00000e+000  A = −1.97496e−004  B = 1.33923e−006
C = −3.21312e−009  D = 1.49212e−012  E = 9.18149e−015  F = 0.00000e+000
Surface 25 r = 6.13808e+001  K = 0.00000e+000  A = −1.60528e−004  B = 1.42133e−006
C = −4.73468e−009  D = 7.84324e−012  E = 0.00000e+000  F = 0.00000e+000

VARIOUS DATA

|   | WIDE | MIDDLE | TELE |
|---|---|---|---|
| Focal Length: | 15.40 | 21.00 | 27.50 |
| FNO: | 2.88 | 3.50 | 4.04 |
| Half Angle of View: | 54.50 | 46.36 | 38.66 |
| Image Height: | 19.00 | 21.00 | 21.64 |
| Overall Length: | 114.50 | 109.76 | 110.87 |
| BF: | 14.15 | 14.15 | 14.15 |

UNIT DISTANCE DATA

|   | WIDE | MIDDLE | TELE | WIDE Close | MIDDLE Close | TELE Close |
|---|---|---|---|---|---|---|
| d0 | 1e+020 | 1e+020 | 1e+020 | 164.0029 | 168.7486 | 167.7180 |
| d8 | 20.7890 | 8.3731 | 0.5000 |   |   |   |
| d21 | 1.0000 | 1.8287 | 2.4376 | 1.7497 | 2.8549 | 3.7827 |
| d23 | 5.5791 | 4.7500 | 4.1420 | 4.9794 | 3.9734 | 3.1461 |
| d25 | 3.3130 | 10.9854 | 19.9752 |   |   |   |

UNIT: mm
SURFACE DATA
|f| = 15.40-27.50 F/2.88-4.04 imgφ = 43.2 ω(°) = 54.5-46.4

UNIT DATA

| Unit | Starting Surface | Focal Length |
|---|---|---|
| B1 | 1 | −24.0596 |
| B2 | 9 | 27.1934 |
| B3 | 22 | −46.9339 |
| B4 | 24 | −108.8331 |
| B5 | 26 | 98.1830 |

Numerical Example 3

UNIT: mm
SURFACE DATA
|f| = 15.40-27.50 F/2.88-4.04 imgφ = 43.2 ω(°) = 54.5-46.4

| B | Surface No. | Effective Diameter | Curvature R | Distance d | glass | nd | vd |
|---|---|---|---|---|---|---|---|
|   | OBJ |   |   | (INF) |   |   |   |
| 1 | 1 | 42.73 | 53.7144 | 2.0000 | SLAH95 | 1.90366 | 31.34 |
|   | 2 | 32.77 | 19.9839 | 3.6500 |   |   |   |
|   | 3 | 32.34 | 26.9212 | 1.6000 | SLAL59 | 1.73400 | 51.47 |
|   | 4 | 28.58 | 17.8618 | 0.0500 | — | 1.51690 | 52.05 |
|   | 5* | 28.44 | 14.0495 | 15.5500 |   |   |   |
|   | 6 | 25.57 | −31.8978 | 1.2500 | SFPL51 | 1.49700 | 81.54 |
|   | 7 | 25.62 | 48.6456 | 4.6500 | SLAH93 | 1.90525 | 35.04 |
|   | 8 | 25.44 | −81.4017 | (20.8779) |   |   |   |
| 2 | 9 | 17.01 | 1e+018 | 0.5000 |   |   |   |
|   | 10 | 16.79 | 38.5709 | 3.0000 | SLAH92 | 1.89190 | 37.13 |
|   | 11 | 16.50 | −80.7396 | 0.3000 |   |   |   |
|   | 12 | 15.29 | 17.2515 | 4.0000 | SFPL51 | 1.49700 | 81.54 |
|   | 13 | 14.33 | −41.5236 | 1.0000 | SLAH89 | 1.85150 | 40.78 |
|   | 14 | 13.30 | 19.7893 | 2.3500 |   |   |   |
|   | s15 | 13.20 | 1e+018 | 5.8500 |   |   |   |
| IS | 16 | 13.64 | 343.2018 | 1.8000 | SLAL14 | 1.69680 | 55.53 |
| IS | 17 | 14.03 | −137.6589 | 1.3000 |   |   |   |
|   | 18 | 14.35 | 61.6151 | 1.0000 | SLAH89 | 1.85150 | 40.78 |
|   | 19 | 14.99 | 14.3967 | 4.1000 | SFPL51 | 1.49700 | 81.54 |
|   | 20 | 16.39 | −481.2238 | 0.3000 |   |   |   |
|   | 21 | 19.08 | 25.2710 | 6.5000 | SFPL51 | 1.49700 | 81.54 |
|   | 22 | 19.90 | −21.9064 | (1.5000) |   |   |   |
| 3 | 23 | 20.11 | −72.1621 | 1.2000 | STIM27 | 1.63980 | 34.47 |
|   | 24 | 20.52 | 52.9174 | (6.0423) |   |   |   |
| 4 | 25* | 22.22 | −1000.0000 | 1.5000 | E48R | 1.53113 | 55.75 |
|   | 26* | 23.57 | 97.5488 | (2.8254) |   |   |   |
| 5 | 27 | 37.61 | 99.8831 | 5.6000 | SBSL7 | 1.51633 | 64.14 |
|   | 28 | 38.28 | −102.1357 |   |   |   |   |
|   | IMG |   |   |   |   |   |   |

Aspherical-data (A4, B6, C8, D10, E12, F16)

Surface 5 r = 1.40495e+001 K = −6.90022e−001 A = −8.65412e−006 B = −3.10402e−008
C = 1.43329e−011 D = 1.59117e−013 E = −2.23934e−015 F = 3.71371e−018
Surface 25 r = −1.00000e+003 K = 0.00000e+000 A = −1.68718e−004 B = 8.57269e−007
C = −1.07815e−009 D = 3.98433e−012 E = −2.18389e−014 F = 0.00000e+000
Surface 26 r = 9.75488e+001 K = 0.00000e+000 A = −1.32827e−004 B = 9.08042e−007
C = −1.58849e−009 D = 9.69538e−013 E = 0.00000e+000 F = 0.00000e+000

VARIOUS DATA

|   | WIDE | MIDDLE | TELE |
|---|---|---|---|
| Focal Length: | 15.40 | 21.00 | 27.50 |
| FNO: | 2.88 | 3.50 | 4.04 |

UNIT: mm
SURFACE DATA
|f| = 15.40-27.50 F/2.88-4.04 imgφ = 43.2 ω(°) = 54.5-46.4

|  | 54.51 | 46.40 | 38.65 |
|---|---|---|---|
| Half Angle of View: | 54.51 | 46.40 | 38.65 |
| Image Height: | 19.00 | 21.00 | 21.64 |
| Overall Length: | 114.50 | 109.55 | 110.39 |
| BF: | 14.20 | 14.20 | 14.20 |

UNIT DISTANCE DATA

|  | WIDE | MIDDLE | TELE | WIDE Close | MIDDLE Close | TELE Close |
|---|---|---|---|---|---|---|
| d0 | 1e+020 | 1e+020 | 1e+020 | 164.0037 | 168.9583 | 168.2033 |
| d8 | 20.8779 | 8.3308 | 0.3000 |  |  |  |
| d22 | 1.5000 | 2.3410 | 3.0183 | 2.3677 | 3.5301 | 4.5417 |
| d24 | 6.0423 | 5.1971 | 4.5282 | 5.2695 | 4.2084 | 3.4226 |
| d26 | 2.8254 | 10.4359 | 19.2763 |  |  |  |

UNIT DATA

| Unit | Starting Surface | Focal Length |
|---|---|---|
| B1 | 1 | −24.6360 |
| B2 | 9 | 27.1234 |
| B3 | 23 | −47.5398 |
| B4 | 25 | −167.2600 |
| B5 | 27 | 98.7349 |

Numerical Example 4

UNIT: mm
SURFACE DATA
|f| = 15.40-27.50 F/4.00-5.60 img = 43.2 ω(°) = 54.5-46.6

| B | Surface No. | Effective Diameter | Curvature R | Distance d | glass | nd | vd |
|---|---|---|---|---|---|---|---|
|  | OBJ |  |  | (INF) |  |  |  |
| 1 | 1 | 38.06 | 41.4839 | 1.8000 | SLAH95 | 1.90366 | 31.34 |
|  | 2 | 29.50 | 17.9768 | 4.2500 |  |  |  |
|  | 3 | 28.98 | 28.5809 | 1.6000 | SLAL59 | 1.73400 | 51.47 |
|  | 4 | 24.94 | 15.9770 | 0.0500 | E48R | 1.53113 | 55.75 |
|  | 5* | 24.80 | 12.9309 | 12.3000 |  |  |  |
|  | 6 | 22.62 | −30.2182 | 1.1000 | SFPL51 | 1.49700 | 81.54 |
|  | 7 | 22.31 | 41.3927 | 3.8000 | SLAH93 | 1.90525 | 35.04 |
|  | 8 | 22.06 | −80.5087 | (17.4679) |  |  |  |
| 2 | 9 | 11.24 | 1e+018 | 0.5000 |  |  |  |
|  | 10 | 11.29 | 35.2013 | 2.3000 | TAFD35 | 1.91082 | 35.25 |
|  | 11 | 11.16 | −72.9822 | 0.3000 |  |  |  |
|  | 12 | 10.76 | 16.2441 | 2.8000 | SFSL5 | 1.48749 | 70.24 |
|  | 13 | 10.13 | −42.0522 | 1.0000 | SLAH60 | 1.83400 | 37.16 |
|  | 14 | 9.66 | 21.5306 | 1.7400 |  |  |  |
|  | s15 | 9.44 | 1e+018 | 3.5000 |  |  |  |
| IS | 16 | 10.04 | 511.1480 | 1.7000 | SBSL7 | 1.51633 | 64.14 |
| IS | 17 | 10.39 | −81.5995 | 1.3000 |  |  |  |
|  | 18 | 10.56 | 34.3408 | 0.7000 | SLAH60 | 1.83400 | 37.16 |
|  | 19 | 10.98 | 10.9733 | 3.2000 | SFSL5 | 1.48749 | 70.24 |
|  | 20 | 12.26 | 75.0874 | 4.8000 |  |  |  |
|  | 21 | 19.29 | 35.4077 | 6.8000 | SFPL51 | 1.49700 | 81.54 |
|  | 22 | 20.29 | −17.0661 | (1.5000) |  |  |  |
| 3 | 23 | 20.34 | −26.2540 | 1.0000 | STIM22 | 1.64769 | 33.79 |
|  | 24 | 21.30 | −424.3896 | (5.1629) |  |  |  |
| 4 | 25* | 22.95 | −1000.0000 | 1.4000 | E48R | 1.53113 | 55.75 |
|  | 26* | 24.24 | 151.7339 | (2.0246) |  |  |  |
| 5 | 27 | 36.95 | 133.0463 | 5.2000 | SBSL7 | 1.51633 | 64.14 |
|  | 28 | 37.71 | −100.3690 |  |  |  |  |
|  | IMG |  |  |  |  |  |  |

-continued

UNIT: mm
SURFACE DATA
|f| = 15.40-27.50 F/4.00-5.60 img = 43.2 ω(°) = 54.5-46.6

Aspherical-data (A4, B6, C8, D10, E12, F16)

Surface 5 r = 1.29309e+001 K = −8.33303e−001 A = 2.51834e−006 B = −1.68699e−007
C = 2.90684e−009 D = −2.77950e−011 E = 1.28327e−013 F = −2.36954e−016
Surface 25 r = −1.00000e+003 K = 0.00000e+000 A = −1.65413e−004 B = 6.31697e−007
C = 3.34699e−010 D = 9.87574e−013 E = −2.03588e−014 F = 0.00000e+000
Surface 26 r = 1.51734e+002 K = 0.00000e+000 A = −1.31250e−004 B = 6.93717e−007
C = −1.77709e−010 D = −2.15299e−012 E = 0.00000e+000 F = 0.00000e+000

VARIOUS DATA

|                    | WIDE   | MIDDLE | TELE   |
|--------------------|--------|--------|--------|
| Focal Length:      | 15.40  | 21.00  | 27.50  |
| FNO:               | 4.00   | 4.82   | 5.60   |
| Half Angle of View:| 54.51  | 46.63  | 38.94  |
| Image Height:      | 19.00  | 21.00  | 21.64  |
| Overall Length:    | 103.50 | 101.16 | 103.50 |
| BF:                | 14.20  | 14.20  | 14.20  |

UNIT DISTANCE DATA

|     | WIDE    | MIDDLE  | TELE    | WIDE Close | MIDDLE Close | TELE Close |
|-----|---------|---------|---------|------------|--------------|------------|
| d0  | 1e+020  | 1e+020  | 1e+020  | 175.0012   | 177.3414     | 175.0466   |
| d8  | 17.4679 | 7.2094  | 0.5000  |            |              |            |
| d22 | 1.5000  | 2.3497  | 3.1696  | 2.3020     | 3.4399       | 4.5699     |
| d24 | 5.1629  | 4.3102  | 3.4961  | 4.4558     | 3.4191       | 2.5136     |
| d26 | 2.0246  | 9.9602  | 18.9768 |            |              |            |

UNIT DATA

| Unit | Starting Surface | Focal Length |
|------|------------------|--------------|
| B1   | 1                | −21.3432     |
| B2   | 8                | 26.2827      |
| B3   | 22               | −43.2507     |
| B4   | 24               | −247.9403    |
| B5   | 26               | 111.6488     |

Numerical Example 5

UNIT: mm
SURFACE DATA
|f| = 15.40-27.50 F/2.88-4.04 img = 43.2 ω(°) = 54.5-45.7

| B  | Surface No. | Effective Diameter | Curvature R | Distance d | glass   | nd      | vd    |
|----|-------------|--------------------|-------------|------------|---------|---------|-------|
|    | OBJ         |                    |             | (INF)      |         |         |       |
| 1  | 1           | 44.57              | 63.7489     | 2.0000     | TAFD37  | 1.90043 | 37.37 |
|    | 2           | 34.00              | 20.7280     | 2.1000     |         |         |       |
|    | 3           | 33.63              | 23.0887     | 2.3000     | MFCD500 | 1.55332 | 71.68 |
|    | 4*          | 29.25              | 13.4554     | 15.2000    |         |         |       |
|    | 5           | 27.31              | −32.6609    | 1.2500     | SFPL51  | 1.49700 | 81.54 |
|    | 6           | 27.23              | 54.2574     | 4.2000     | TAFD37  | 1.90043 | 37.37 |
|    | 7           | 27.11              | −91.2103    | 23.8241    |         |         |       |
| 2a | 8           | 16.02              | 1e+018      | 0.5000     |         |         |       |
|    | 9           | 16.17              | 47.6423     | 3.0000     | SLAH58  | 1.88300 | 40.76 |
|    | 10          | 16.04              | −59.7711    | 0.3000     |         |         |       |
|    | 11          | 15.28              | 21.9060     | 4.0000     | SFPL51  | 1.49700 | 81.54 |
|    | 12          | 14.40              | −35.3171    | 1.0000     | SLAH89  | 1.85150 | 40.78 |
|    | 13          | 13.67              | 28.3571     | 3.2000     |         |         |       |
|    | s14         | 13.42              | 1e+018      | 8.0185     |         |         |       |

-continued

UNIT: mm
SURFACE DATA
|f| = 15.40-27.50 F/2.88-4.04 img = 43.2 ω(°) = 54.5-45.7

| | | | | | | | |
|---|---|---|---|---|---|---|---|
| 2b | 15 | 15.38 | 1e+018 | 1.8000 | | | |
| | 16 | 16.92 | 48.0443 | 0.9000 | SLAH89 | 1.85150 | 40.78 |
| | 17 | 17.45 | 16.0000 | 5.8000 | SFPL51 | 1.49700 | 81.54 |
| | 18 | 19.25 | −78.3780 | 0.4000 | | | |
| | 19 | 22.07 | 32.3744 | 7.0000 | SFPM2 | 1.59522 | 67.73 |
| | 20 | 22.69 | −27.2936 | 1.0000 | | | |
| 3 | 21 | 21.96 | −144.1713 | 1.0000 | SLAM73 | 1.79360 | 37.09 |
| | 22 | 21.91 | 47.9578 | 5.1449 | | | |
| 4 | 23* | 22.79 | −1000.0000 | 1.4000 | E48R | 1.53113 | 55.75 |
| | 24* | 24.04 | 58.0943 | 2.9715 | | | |
| 5 | 25 | 32.82 | −377.5531 | 5.6000 | SFPL55 | 1.43875 | 94.66 |
| | 26 | 34.00 | −38.4986 | | | | |
| | IMG | | | | | | |

Aspherical-data (A4, B6, C8, D10, E12, F16)

Surface 4 r = 1.34554e+001 K = −6.42778e−001 A = −3.81783e−006 B = −1.06924e−008
C = −4.53688e−011 D = 7.84128e−013 E = −4.33733e−015 F = 7.32747e−018
Surface 23 r = −1.00000e+003 K = 0.00000e+000 A = −1.83984e−004 B = 1.16015e−006
C = −2.73937e−009 D = 1.20415e−012 E = 1.04060e−014 F = 0.00000e+000
Surface 24 r = 5.80943e+001 K = 0.00000e+000 A = −1.45895e−004 B = 1.26268e−006
C = −4.12911e−009 D = 6.39269e−012 E = 0.00000e+000 F = 0.00000e+000

VARIOUS DATA

| | WIDE | MIDDLE | TELE |
|---|---|---|---|
| Focal Length: | 15.40 | 21.00 | 27.50 |
| FNO: | 2.88 | 3.50 | 4.04 |
| Half Angle of View: | 54.50 | 45.73 | 37.92 |
| Image Height: | 19.00 | 21.00 | 21.64 |
| Overall Length: | 118.15 | 111.42 | 109.20 |
| BF: | 14.24 | 14.67 | 17.45 |

UNIT DISTANCE DATA

| | WIDE | MIDDLE | TELE | WIDE Close | MIDDLE Close | TELE Close |
|---|---|---|---|---|---|---|
| d0 | 1e+020 | 1e+020 | 1e+020 | 160.3498 | 167.0825 | 169.3532 |
| d7 | 23.8241 | 10.0871 | 0.5000 | | | |
| d14 | 8.0185 | 7.8625 | 7.0461 | | | |
| d20 | 1.0000 | 1.8761 | 2.6947 | 1.7335 | 2.8863 | 4.0726 |
| d22 | 5.1449 | 5.3111 | 5.7716 | 4.5615 | 4.5512 | 4.7417 |
| d24 | 2.9715 | 8.6662 | 12.7907 | | | |
| d26 | 0.3000 | 0.7251 | 3.5068 | | | |

UNIT DATA

| Unit | Starting Surface | Focal Length |
|---|---|---|
| B1 | 1 | −24.5304 |
| B2 | 8 | 43.8910 |
| B3 | 15 | 24.6035 |
| B4 | 21 | −45.2423 |
| B5 | 23 | −103.3256 |
| B6 | 25 | 97.2197 |

| | | Ex. 1 | Ex. 2 | Ex. 3 | Ex. 4 | Ex. 5 |
|---|---|---|---|---|---|---|
| focal length | fw | 16.45 | 15.40 | 15.40 | 15.40 | 15.40 |
| focal length | ft | 27.5 | 27.50 | 27.50 | 27.50 | 27.50 |
| half angle of view | ωw | 52.71 | 54.5 | 54.5 | 54.5 | 54.5 |
| paraxial image height | yim | 21.60 | 21.60 | 21.60 | 21.60 | 21.60 |
| overall lens length | Lw | 134.57 | 116 | 114.50 | 103.50 | 119.65 |
| back | BFw | 14.07 | 14.15 | 14.20 | 14.20 | 14.24 |

-continued

|  |  | Ex. 1 | Ex. 2 | Ex. 3 | Ex. 4 | Ex. 5 |
|---|---|---|---|---|---|---|
| focal length of G1 | fg1 | −37.7 | −36.3 | −36.2 | −36.4 | −34.3 |
| focal length of 2a unit | f2a | 53.7 | 44.1 | 45.9 | 34.6 | 43.9 |
| focal length of 2b unit | f2b | 25.5 | 24.9 | 26.4 | 27.5 | 24.6 |
| thickness of second unit | D2 | 40.40 | 32.72 | 31.50 | 30.14 | 27.71 |
| average refractive index of L11 | Nd11 | 1.904 | 1.904 | 1.904 | 1.904 | 1.900 |
| average Abbe number of L11 | vd11 | 31.31 | 31.31 | 31.31 | 31.31 | 31.37 |
| average refractive index of L12 | Nd12 | 1.625 | 1.625 | 1.633 | 1.633 | 1.553 |
| average Abbe number of L12 | vd12 | 51.76 | 51.76 | 53.61 | 53.61 | 71.68 |
| Expression (1) | fg1/fw | −2.29 | −2.40 | −2.35 | −2.37 | −2.26 |
| Expression (2) | mR/BFw | 0 | 0 | 0 | 0 | 0.225 |
| Expression (3) | f3/ft | −1.71 | −1.71 | −1.73 | −1.57 | −1.65 |
| Expression (4) | fR/fw | 5.93 | 6.38 | 6.41 | 7.25 | 6.81 |
| Expression (5) | Lw/fw | 8.18 | 7.53 | 7.44 | 6.72 | 7.77 |
| Expression (6) | Lw/BFw | 9.56 | 8.20 | 8.06 | 7.23 | 8.40 |
| Expression (7) | f2/fw | 1.98 | 1.77 | 1.76 | 1.71 | 1.80 |
| Expression (8) | D2/fw | 2.46 | 2.12 | 2.05 | 1.96 | 1.80 |
| Expression (9) | f2a/f2b | 2.11 | 1.77 | 1.74 | 1.26 | 1.78 |
| Expression (10) | vd11 | 31.31 | 31.31 | 31.31 | 31.31 | 31.31 |
| Expression (11) | Nd11 | 1.904 | 1.904 | 1.904 | 1.904 | 1.904 |
| Expression (12) | Nd11/Nd12 | 1.17 | 1.17 | 1.17 | 1.17 | 1.22 |
| Expression (13) | vd11/vd12 | 0.60 | 0.60 | 0.58 | 0.58 | 0.52 |
| Expression (14) | distw | −12.0 | −12.0 | −12.0 | −12.0 | −12.0 |

Moving amount of each unit (in zooming from wide angle end to telephoto end: movement to object side is +) (mm)

|  |  | Ex. 1 | Ex. 2 | Ex. 3 | Ex. 4 | Ex. 5 |
|---|---|---|---|---|---|---|
| first lens unit | m1 | −15.20 | −3.63 | −4.12 | −0.01 | −8.95 |
| second lens unit | m2 | 12.80 | 16.66 | 16.45 | 16.96 | 14.38 |
| third lens unit | m3 | 11.00 | 15.23 | 14.94 | 15.29 | 15.35 |
| fourth lens unit | m4 | 12.80 | 16.66 | 16.45 | 16.96 | 13.65 |
| fifth lens unit | m5 | 0.00 | 0.00 | 0.00 | 0.00 | 13.03 |
| sixth lens unit | m6 | — | — | — | — | 3.21 |

Figure 11:
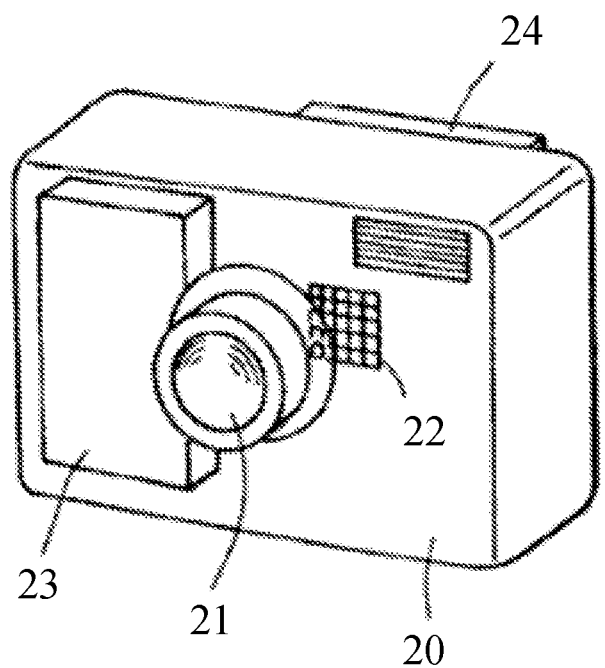
FIG. 11 is a schematic view illustrating an image pickup apparatus provided with one of the zoom lenses according to the Examples 1-5.

FIG. 11 illustrates a digital still camera as an image pickup apparatus using the zoom lens in each example as an image pickup optical system. A reference numeral 20 denotes a camera main body, and a reference numeral 21 denotes the image pickup optical system configured by one of the zoom lenses in the Examples 1 to 5. A reference numeral 22 denotes a solid-state image sensor such as a CCD sensor or a CMOS sensor which is built in the camera main body 20 and is configured to capture an optical image, or an object image, formed by the image pickup optical system 21. A reference numeral 23 denotes a memory configured to store image data generated by processing an image pickup signal from the image sensor 22, and a reference numeral 24 denotes a rear display configured to display the image data.

When the zoom lens in each example is used, it is possible to acquire a small-sized camera having high optical performance.

The camera may be a single-lens reflex camera having a quick turn mirror, or may be a mirrorless camera not having a quick turn mirror.

According to the above examples, it is possible to provide a zoom lens which can correct distortion and field curvature well while having a wide angle and being easily manufactured.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-172111, filed on Oct. 12, 2020 which is hereby incorporated by reference herein in its entirety.

What is claimed is:

1. A zoom lens comprising, in order from an object side to an image side:
   a first lens unit having a negative refractive power;
   a second lens unit having a positive refractive power;
   a third lens unit having a negative refractive power;
   a fourth lens unit having a negative refractive power; and
   a rear lens unit having a positive refractive power and disposed closest to an image plane,
   wherein during zooming from a wide-angle end to a telephoto end, the second lens unit moves to the object side, and each distance between adjacent lens units changes,
   wherein the first lens unit includes a first lens element disposed at a most-object side position and a second lens element disposed adjacent on the image side to the first lens element,
   wherein the second lens element is made of multiple materials that are different from each other,
   wherein the following inequality is satisfied:

$$1.553 \leq Nd12 \leq 1.633$$

where the Nd12 is average refractive index of the second lens element,
   wherein the second lens unit consists of, in order from the object side to the image side, a first sub-lens unit having a plurality of lenses, a diaphragm, and a second sub-lens unit having a plurality of lenses,
   wherein the first sub-lens unit, the diaphragm, and the second sub-lens unit are configured to integrally move during zooming from a wide-angle end to a telephoto end, and
   wherein following inequalities are satisfied:

$$-3.7 \leq fg1/fw \leq -1.5$$

$$-0.10 \leq mR/BFw \leq 0.30$$

where fg1 represents a focal length of the first lens element, fw represents a focal length of the zoom lens at the wide-angle end, BFw represents a back focus at the wide-angle end, mR represents a moving amount of the rear lens unit during zooming from the wide-angle end to the telephoto end, and a sign of the moving amount is positive when a position of the rear lens unit at the telephoto end is closer to the object than a position of the rear lens unit at the wide-angle end, and is negative when a position of the rear lens unit at the telephoto end is closer to the image plane than the position of the rear lens unit at the wide-angle end.

2. The zoom lens according to claim 1,
wherein during focusing from an infinite distance to a close distance, the third lens unit moves to the image side, and
wherein a following inequality is satisfied:

$$-4.00 \leq f3/ft \leq -0.65$$

where f3 represents a focal length of the third lens unit, and ft represents a focal length of the zoom lens at the telephoto end.

3. The zoom lens according to claim 1,
wherein a following inequality is satisfied:

$$3.0 \leq fR/fw \leq 12.0$$

where fR represents a focal length of the rear lens unit.

4. The zoom lens according to claim 1, wherein a following inequality is satisfied:

$$5.0 \leq Lw/fw \leq 12.0$$

where Lw represents a distance on an optical axis from a lens surface closest to the object in the zoom lens to the image plane at the wide-angle end.

5. The zoom lens according to claim 1,
wherein a following inequality is satisfied:

$$5.0 \leq Lw/BFw \leq 15.0$$

where Lw represents a distance on an optical axis from a lens surface closest to the object in the zoom lens to the image plane at the wide-angle end.

6. The zoom lens according to claim 1,
wherein a following inequality is satisfied:

$$1.1 \leq f2/fw \leq 3.5$$

where f2 represents a focal length of the second lens unit.

7. The zoom lens according to claim 1,
wherein a following inequality is satisfied:

$$0.8 \leq D2/fw \leq 6.0$$

where $D2$ represents *a* distance *on* an optical axis from *a* lens surface closest to the object in the second lens unit to a lens surface closest to the image plane in the second lens unit.

8. The zoom lens according to claim 1,
wherein the first sub-lens unit has a positive refractive power, and the second sub-lens unit has a positive refractive power.

9. The zoom lens according to claim 8,
wherein a following inequality is satisfied:

$$0.8 \leq f2a/f2b \leq 5.0$$

where f2a represents a focal length of the first sub-lens unit, and f2b represents a focal length of the second sub-lens unit.

10. The zoom lens according to claim 1,
wherein a following inequality is satisfied:

$$15 \leq vdg1 \leq 40$$

where vdg1 represents an Abbe number with respect to a d-line of material of a lens closest to the object.

11. The zoom lens according to claim 1,
wherein a following inequality is satisfied:

$$1.8 \leq Ndg1 \leq 2.1$$

where Ndg1 represents a refractive power at a d-line of material of a lens closest to the object.

12. The zoom lens according to claim 1,
wherein a following inequality is satisfied:

$$1.01 \leq Nd11/Nd12 \leq 1.50$$

where Nd11 represents an average refractive index at a d-line of the first lens element, and Nd12 represents an average refractive index at the d-line of the second lens element.

13. The zoom lens according to claim 1,
wherein a following inequality is satisfied:

$$0.3 \leq vd11/vd12 \leq 0.9$$

where vd11 represents an average Abbe number with respect to a d-line of the first lens element, and vd12 represents an average Abbe number with respect to the d-line of the second lens element.

14. The zoom lens according to claim 1,
wherein the second lens element has a negative refractive power, and includes a lens including a spherical surface and a layer including an aspherical surface provided on the spherical surface.

15. The zoom lens according to claim 14,
wherein the lens including the spherical surface is made of inorganic material, and the layer including the aspherical surface is made of organic material.

16. The zoom lens according to claim 1,
wherein a following inequality is satisfied:

$$-30 \leq distw \leq -7$$

where distw represents a distortion amount of the zoom lens at the wide-angle end.

17. The zoom lens according to claim 1,
wherein for zooming, the rear lens unit does not move.

18. The zoom lens according to claim 1,
wherein a following inequality is satisfied:

$$-3.4 \leq fg1/fw \leq -2.0.$$

19. The zoom lens according to claim 1,
wherein the first sub-lens unit has a positive refractive power, and the second sub-lens unit has a positive refractive power,
wherein a following inequality is satisfied:

$$1.1 \leq f2a/f2b \leq 5.0$$

where f2a represents a focal length of the first sub-lens unit, and f2b represents a focal length of the second sub-lens unit.

20. The zoom lens according to claim 1,
wherein the first sub-lens unit has a positive refractive power, and the second sub-lens unit has a positive refractive power,
wherein a following inequality is satisfied:

$$1.26 \leq f2a/f2b \leq 5.0$$

where f2a represents a focal length of the first sub-lens unit, and f2b represents a focal length of the second sub-lens unit.

21. The zoom lens according to claim 1,
wherein a following inequality is satisfied:

$$1.05 \leq Nd11/Nd12 \leq 1.50$$

where Nd11 represents an average refractive index at a d-line of the first lens element, and Nd12 represents an average refractive index at the d-line of the second lens element.

22. The zoom lens according to claim 1, wherein a following inequality is satisfied:

$$1.10 \leq Nd11/Nd12 \leq 1.50$$

where Nd11 represents an average refractive index at a d-line of the first lens element, and Nd12 represents an average refractive index at the d-line of the second lens element.

23. The zoom lens according to claim 1, wherein the first sub-lens unit includes two positive lenses, and the second sub-lens unit includes two positive lenses.

24. The zoom lens according to claim 1, wherein the first sub-lens unit includes two positive lenses and ne negative lens, and the second sub-lens unit includes two positive lenses and one negative lens.

25. The zoom lens according to claim 1, wherein the total number of lens units included in the zoom lens is five.

26. An image pickup apparatus comprising:
a zoom lens including, in order from an object side to an image side:
a first lens unit having a negative refractive power;
a second lens unit having a positive refractive power;
a third lens unit having a negative refractive power;
a fourth lens unit having a negative refractive power; and
a rear lens unit having a positive refractive power and disposed closest to an image plane,
wherein during zooming from a wide-angle end to a telephoto end, the second lens unit moves to the object side, and each distance between adjacent lens units changes,
wherein the first lens unit includes a first lens element disposed at a most-object side position and a second lens element disposed adjacent on the image side to the first lens element,
wherein the second lens element is made of multiple materials that are different from each other,
wherein the following inequality is satisfied:

$$1.553 \leq Nd12 \leq 1.633$$

where the Nd12 is average refractive index of the second lens element,
wherein the second lens unit consists of, in order from the object side to the image side, a first sub-lens unit having a plurality of lenses, a diaphragm, and a second sub-lens unit having a plurality of lenses,
wherein the first sub-lens unit, the diaphragm, and the second sub-lens unit are configured to integrally move during zooming from a wide-angle end to a telephoto end, and
wherein following inequalities are satisfied:

$$-3.7 \leq fg1/fw \leq -1.5$$

$$-0.10 \leq mR/BFw \leq 0.30$$

where fg1 represents a focal length of the first lens element, fw represents a focal length of the zoom lens at the wide-angle end, BFw represents a back focus at the wide-angle end, mR represents a moving amount of the rear lens unit during zooming from the wide-angle end to the telephoto end, and a sign of the moving amount is positive when a position of the rear lens unit at the telephoto end is closer to the object than a position of the rear lens unit at the wide-angle end, and is negative when a position of the rear lens unit at the telephoto end is closer to the image plane than the position of the rear lens unit at the wide-angle end; and
an image sensor configured to capture the object via the zoom lens.

27. The image pickup apparatus according to claim 26, wherein during focusing from an infinite distance to a close distance, the third lens unit moves to the image side, and
wherein a following inequality is satisfied:

$$-4.00 \leq f3/ft \leq -0.65$$

where f3 represents a focal length of the third lens unit, and ft represents a focal length of the zoom lens at the telephoto end.

* * * * *